US011488599B2

(12) United States Patent
Chen et al.

(10) Patent No.: US 11,488,599 B2
(45) Date of Patent: Nov. 1, 2022

(54) SESSION MESSAGE PROCESSING WITH GENERATING RESPONSES BASED ON NODE RELATIONSHIPS WITHIN KNOWLEDGE GRAPHS

(71) Applicant: Microsoft Technology Licensing, LLC, Redmond, WA (US)

(72) Inventors: Ling Chen, Cupertino, CA (US); Yu Shi, Redmond, WA (US); Yining Chen, Redmond, WA (US); Nanshan Zeng, Redmond, WA (US); Dong Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 16/979,844

(22) PCT Filed: Apr. 6, 2019

(86) PCT No.: PCT/US2019/026214
§ 371 (c)(1),
(2) Date: Sep. 10, 2020

(87) PCT Pub. No.: WO2019/209501
PCT Pub. Date: Oct. 31, 2019

(65) Prior Publication Data
US 2021/0043207 A1 Feb. 11, 2021

(30) Foreign Application Priority Data
Apr. 24, 2018 (CN) .......................... 201810371441.0

(51) Int. Cl.
*G06F 40/30* (2020.01)
*G10L 15/22* (2006.01)
(Continued)

(52) U.S. Cl.
CPC ............ *G10L 15/22* (2013.01); *G06F 16/332* (2019.01); *G06F 16/367* (2019.01); *G06F 40/30* (2020.01); *G10L 15/04* (2013.01); *G10L 15/26* (2013.01)

(58) Field of Classification Search
CPC .. G06F 40/30; G06F 16/9024; G06F 16/3329; G06F 16/3344
See application file for complete search history.

(56) References Cited

U.S. PATENT DOCUMENTS 5,673,369 A 9/1997 Kim
9,865,260 B1 1/2018 Vuskovic et al.
(Continued)

OTHER PUBLICATIONS

"Resource Description Framework (RDF)", Retrieved from: https://www.w3.org/RDF/, Feb. 10, 2004, 3 Pages.
(Continued)

*Primary Examiner* — Jialong He
(74) *Attorney, Agent, or Firm* — Schwegman Lundberg & Woessner, P.A.

(57) ABSTRACT

The present disclosure provides method and apparatus for processing a message. A statement sentence message and a message processing parameter associated with a user's session message are obtained. One or more first statement sentence nodes that are semantic-matched with the statement sentence message are determined in the knowledge map. One or more second statement sentence nodes corresponding to the message processing parameters are obtained from the knowledge map, based on the node relationship properties of the first statement sentence nodes. A response is generated based at least in part on statement sentences of the one or more second statement sentence nodes. The generated response is provided to the user.

19 Claims, 17 Drawing Sheets

(51) Int. Cl.
  *G06F 16/36* (2019.01)
  *G06F 16/332* (2019.01)
  *G10L 15/04* (2013.01)
  *G10L 15/26* (2006.01)

(56) References Cited

U.S. PATENT DOCUMENTS

| | | | |
|---|---|---|---|
| 2012/0158633 A1* | 6/2012 | Eder | G16H 50/20 707/E17.014 |
| 2015/0293904 A1 | 10/2015 | Roberts | |
| 2015/0363702 A1 | 12/2015 | Baum | |
| 2016/0019280 A1 | 1/2016 | Unger et al. | |
| 2016/0371385 A1* | 12/2016 | Keysar | G06F 16/36 |
| 2017/0230312 A1 | 8/2017 | Barrett et al. | |
| 2017/0344649 A1* | 11/2017 | Vinnakota | G06F 16/2465 |
| 2017/0357638 A1 | 12/2017 | Schlesinger et al. | |
| 2018/0077088 A1* | 3/2018 | Cabrera-Cordon | H04L 67/306 |

OTHER PUBLICATIONS

Besnard, et al., "Constructing Argument Graphs with Deductive Arguments: A Tutorial", In Argument and Computation, vol. 5, Issue 1, Jan. 2, 2014, pp. 5-30.
Besnard, et al., "Encoding Argument Graphs in Logic", In International Conference on Information Processing and Management of Uncertainty in Knowledge-Based Systems, Jul. 15, 2014, 11 Pages.
Bex, et al., "On Logical Reifications of the Argument Interchange Format", In Journal of Logic and Computation, vol. 23, Issue 5, Sep. 2012, 37 Pages.
Craven, et al., "Argument Graphs and Assumption-Based Argumentation", In Artificial Intelligence, vol. 233, Dec. 11, 2015, 74 Pages.
Hunter, Anthony, "Measuring Inconsistency in Argument Graphs", In Repository of arXiv:1708.02851, Aug. 10, 2017, 29 Pages.
Jurafsky, et al., "Dialog Systems and Chatbots", In Publication of Pearson, 2000, pp. 1-25.
"International Search Report and Written Opinion issued in PCT Application No. PCT/US19/026214", dated Jul. 11, 2019, 11 Pages.
Rakshit, et al., "Debbie, the Debate Bot of the Future", Retrieved from: https://arxiv.org/pdf/1709.03167.pdf, Sep. 10, 2017, 6 Pages.
Standefer, et al., "Manage Conversation Flow with Dialogs in the v3 JavaScript SDK", Retrieved From: https://docs.microsoft.com/en-us/azure/bot-service/nodejs/bot-builder-nodejs-dialog-manage-conversation-flow?view=azure-bot-service-3.0, Dec. 13, 2017, 13 Pages.
"Office Action Issued in European Patent Application No. 19719014.3", dated Jun. 13, 2022, 6 Pages.

* cited by examiner

Many young people like Jay Chou's songs because Jay Chou's songs have a strong sense of rhythm. In addition, Jay Chou's stage fan is very cool, and thus young people like Jay Chou's songs. In addition, Jay Chou's handsome look is also a reason why young people like Jay Chou's songs. Because the pronunciation of the words is unclear when Jay Chou is singing, some young people dislike Jay Chou's songs.

SESSION MESSAGE PROCESSING WITH GENERATING RESPONSES BASED ON NODE RELATIONSHIPS WITHIN KNOWLEDGE GRAPHS

CROSS-REFERENCE TO RELATED APPLICATION

This application is a U.S. National Stage Filing under 35 U.S.C. 371 of International Patent Application Serial No. PCT/US2019/026214, filed Apr. 6, 2019, and published as WO 2019/209501 A1 on Oct. 31, 2019, which claims priority to Chinese Application No. 201810371441,0, filed Apr. 24, 2018; which applications and publication are incorporated herein by reference in their entirety.

BACKGROUND

With the development of artificial intelligence (AI) technology, session interactions between users and machines are becoming more and more popular, such as session interactions between users and question-answer (QA) systems, session interactions between users and chat bots, etc. When each session interaction between the user and the machine occurs, the machine uses a session message obtained during the current session interaction with the user as a query message, or obtains a query message by analyzing a session message obtained during the current session interaction with the user, searches in the local database or on the Internet based on the query message, and then provides the search result as a response to the current interaction with the user, so that the QA or the conversation with the user may continue.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for processing a message. A statement sentence message and a message processing parameter associated with the user's session message are obtained. One or more first statement sentence nodes that are semantic-matched with the statement sentence message are identified in a knowledge map. One or more second statement sentence nodes indicated by the node relationship properties of the one or more first statement sentence nodes corresponding to the message processing parameter are obtained from the knowledge map. A response is generated based at least in part on statement sentences of the one or more second statement sentence nodes. The generated response is provided to the user.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

FIG. 7 illustrates an exemplary webpage document for building a knowledge map according to an embodiment.

DETAILED DESCRIPTION

Figure 1:
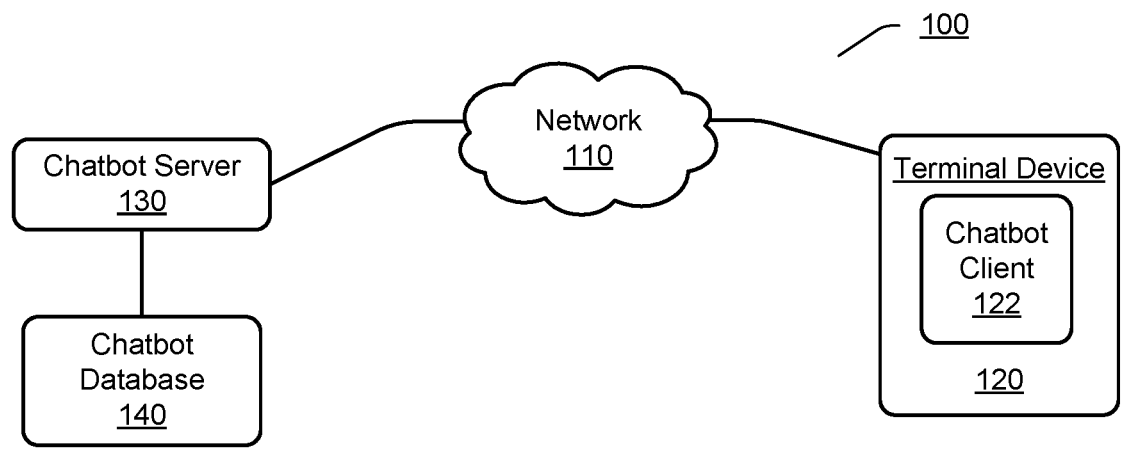
FIG. 1 illustrates an exemplary application scenario of a chat bot according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

With the development of artificial intelligence technology, it is more and more popular for a user to perform a session interaction with an electronic device (such as an electronic conversational agent), such as a question and answer, an automatic chat, an information retrieval query, and a decision consultation. In order to ensure that the user experience is like communicating with real humans, when answering a question or debating a topic with a user, the electronic device needs to keep the conversation logic correct and keep the reply or inquiry of the electronic device on the same topic or the like as the user, without getting off the topic.

Embodiments of the present disclosure provide an electronic session proxy that processing a session message during a session interaction with a user. The electronic session proxy may determine a statement sentence message and a message processing parameter by analyzing the user's session message. A statement sentence message is used as a query for a statement sentence-based knowledge map. The knowledge map consists of a plurality of statement sentence nodes; each statement sentence node has a statement sentence and a node relationship property. The message processing parameter is used to indicate the type of the query service, i.e., the user needs to query based on which node relationship property of the statement sentence node. After the statement sentence message is determined, one or more first statement sentence nodes semantic-matched with the statement sentence message are determined from the knowledge map. And then one or more second statement sentence nodes indicated by the node relationship properties of the one or more first statement sentence nodes corresponding to the message processing parameter are determined from the knowledge map, thereby a response is generated based on statement sentences of the one or more second statement sentence nodes and provided to the user.

Electronic conversational agents may be applied to a variety of application scenarios, such as QA systems, chat bots, decision systems, and search engines and the like. For example, with the electronic conversation proxy, a machine may answer the questions raised by the user, provide a decision to a user when the user asks for the decision, and provide a query result to a user when the user performs an information query, or a user may automatically chat with the chat bot. The following describes an embodiment of the present disclosure by taking a chat robot as an example. It should be noted that the following description of the chat robot is also applicable to other application scenarios, such as a QA system, a decision system, a search engine, and the like.

According to an embodiment of the present disclosure, the node relationship property may comprise at least one of an inter-node causation relationship property, a node topic category property, and an inter-node topic correlation property. When the message processing parameter indicates that the query is performed in the knowledge map based on the inter-node causation relationship property, statement sentences of one or more second statement sentence nodes that are the premise or conclusion of the statement sentence message may be obtained from the knowledge map as a response. When the message processing parameter indicates that the query is based on the node topic category property, statement sentences of one or more second statement sentence nodes belonging to the same topic as that of the statement sentence message may be obtained from the knowledge map as a response. When the message processing parameter indicates that the query is based on the inter-node topic correlation property, statement sentences of one or more second statement sentence nodes having a topic correlation with the topic related to the statement sentence message may be obtained from the knowledge map as a response.

According to an embodiment of the present disclosure, the node relationship property may also comprise an inter-node synonymous relationship property. When a session message is processed, statement sentences of one or more third statement sentence nodes having a synonymous relationship with the one or more second statement sentence nodes, which are obtained from the above-described inter-node causation relationship property, node topic category property, and/or inter-node topic correlation property, may be obtained from the knowledge map. Statement sentences of the one or more third statement sentence nodes and the one or more second statement sentence nodes are taken as the response.

According to an embodiment of the present disclosure, the node relationship property may also comprise a node standpoint property. When the message processing parameter further indicates that the statement sentences are obtained based on the standpoint, the node standpoint parameter associated with the session message may be determined, and statement sentences that are matched with the determined node standpoint parameter are obtained from the statement sentences of the one or more second statement sentence nodes. The node standpoint parameter may be determined based on the user's session message, the context message of the session message, the user's standpoint preference information, and a set standpoint processing rule, and the like.

According to an embodiment of the present disclosure, the statement sentence nodes have a source webpage address and/or a timestamp. The statement sentences obtained based on the node relationship property may be filtered using the source webpage address and/or the timestamp of the statement sentence, so as to provide the user with more authoritative and/or timeliness statement sentences.

According to an embodiment of the present disclosure, a statement sentence node-complete sentence mapping is also stored in the knowledge map. Based on the statement sentence node-complete sentence mapping, complete sentences corresponding to the statement sentence obtained based on the node relationship property may be obtained, so that not only the statement sentences may be provided to the user, but also the corresponding complete sentences may be provided to the user.

FIG. 1 illustrates an exemplary application scenario 100 of a chat bot according to an embodiment.

In FIG. 1, a network 110 is applied for interconnecting among a terminal device 120 and a chat bot server 130.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be desktop computers, laptops, tablets, smart phones, etc. Although only one terminal device is shown in FIG. 1, it should be appreciated that a different number of terminal devices may connect to the network 110.

In an implementation, the terminal device 120 may be used by a user. The terminal device 120 may include a chat bot client 122 which may provide automated chatting service for the user. In some cases, the chat bot client 122 may interact with the chat bot server 130. For example, the chat bot client 122 may transmit messages input by the user to the chat bot server 130, receive responses associated with the messages from the chat bot server 130, and provide the responses to the user. However, it should be appreciated that, in other cases, instead of interacting with the chat bot server 130, the chat bot client 122 may also locally generate responses to messages input by the user. In the present disclosure, "message" may refer to any input message, for example, a query from a user, an answer of a user to a question from a chat bot, etc.

The chat bot server 130 may connect to or incorporate a chat bot database 140. The chat bot database 140 may comprise information that may be used by the chat bot server 130 for generating responses.

It should be appreciated that all the network entities shown in FIG. 1 are exemplary, and depending on specific application requirements, any other network entities may be involved in the application scenario 100.

Figure 2:
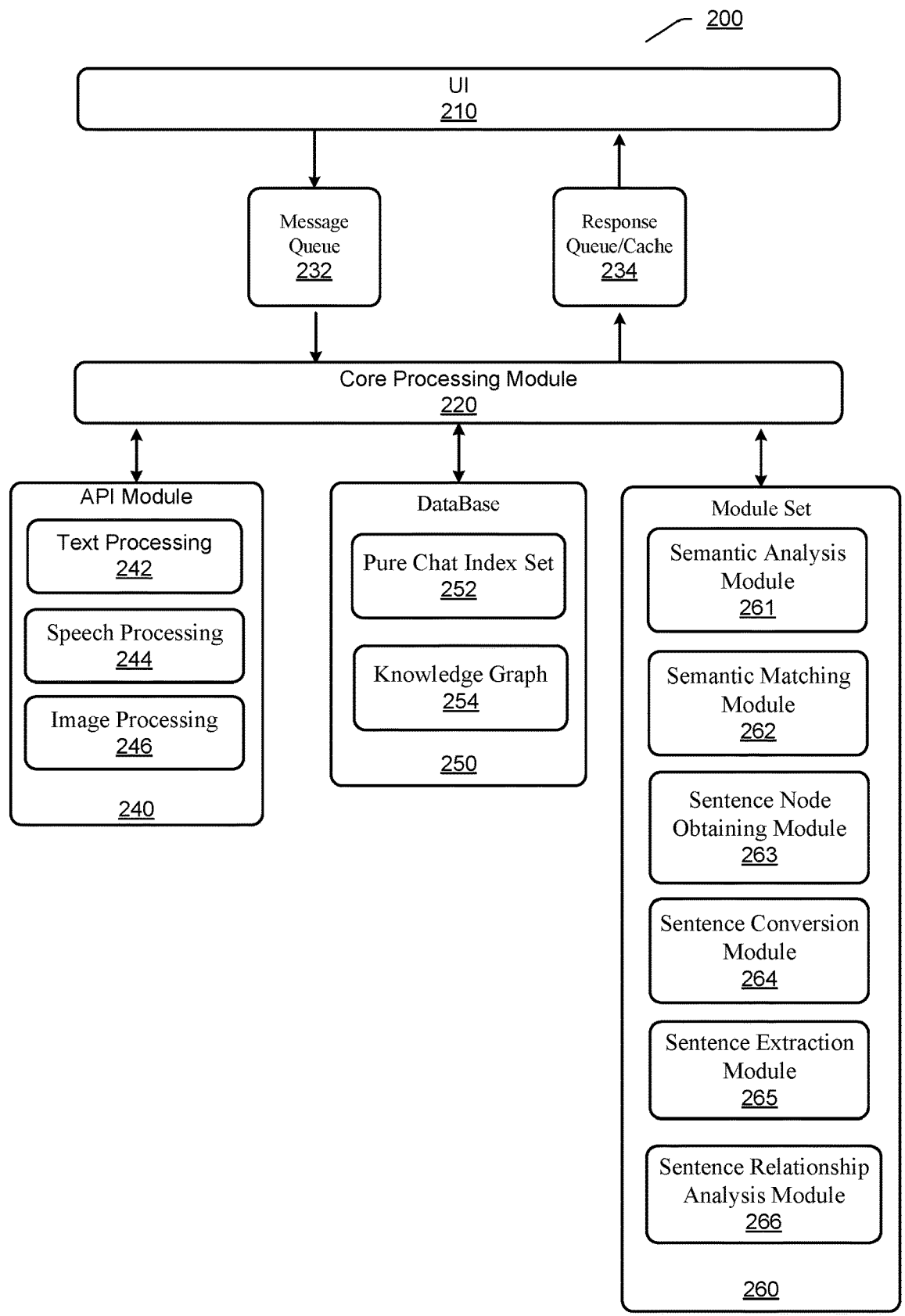
FIG. 2 illustrates an exemplary chat bot system according to an embodiment.

FIG. 2 illustrates an exemplary chat bot system 200 according to an embodiment.

The chat bot system 200 may comprise a user interface (UI) 210 for presenting a chat window. The chat window may be used by the chat bot for interacting with a user.

The chat bot system 200 may comprise a core processing module 220. The core processing module 220 is configured for, during operation of the chat bot, providing processing capabilities through cooperation with other modules of the chat bot system 200.

The core processing module 220 may obtain messages input by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing module 242, a speech processing module 244, an image processing module 246, etc.

For a text message, the text processing module 242 may perform text understanding on the text message, and the core processing module 220 may further determine a text response.

For a speech message, the speech processing module 244 may perform a speech-to-text conversion on the speech message to obtain text sentences, the text processing module 242 may perform text understanding on the obtained text sentences, and the core processing module 220 may further determine a text response. If it is determined to provide a response in speech, the speech processing module 244 may perform a text-to-speech conversion on the text response to generate a corresponding speech response.

For an image message, the image processing module 246 may perform image recognition on the image message to generate corresponding texts, and the core processing module 220 may further determine a text response. In some cases, the image processing module 246 may also be used for obtaining an image response based on the text response.

Moreover, although not shown in FIG. 2, the API module 240 may also comprise any other processing modules. For example, the API module 240 may comprise a video processing module for cooperating with the core processing module 220 to process a video message and determine a response.

The core processing module 220 may determine responses through a database 250. The database 250 may comprise a plurality of index items that may be retrieved by the core processing module 220 for determining responses.

The database 250 may comprise a pure chat index set 252. The pure chat index set 252 may comprise index items that are prepared for free chatting between the chat bot and users, and may be established with data from, e.g., social networks. The index items in the pure chat index set 252 may or may not be in a form of question-answer (QA) pair, e.g., <question, answer>. Question-answer pair may also be referred to as message-response pair.

The database 250 may comprise a statement sentence-based knowledge graph 254. Herein, the knowledge graph 254 may be established based on statement sentences mined from web documents, and may be continuously extended with more and more web documents obtained from the network. In an implementation, the knowledge graph 254 may refer to a single knowledge graph or a combination of a plurality of knowledge graphs.

Figure 3:
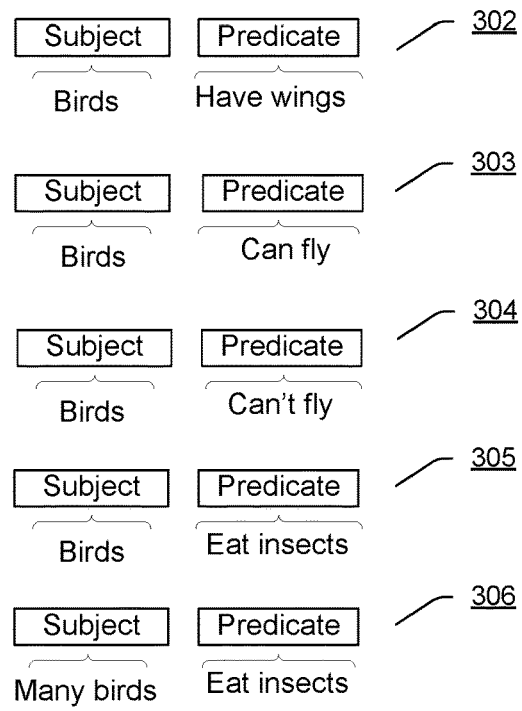
FIG. 3 illustrates an exemplary statement sentence according to an embodiment.

A statement sentence is a sentence consisting of a subject term and a predicate term. Here, the subject term and the predicate term are terms of the discipline of logic. The subject item refers to a subject of a sentence component. A predicate term refers to the bearer of the specific description of the subject item. FIG. 3 illustrates several examples of statement sentences according to an embodiment. As shown in FIG. 3, "birds have wings" is a statement sentence, in which "birds" is the subject term and "have wings" is the predicate term. When building a knowledge map, the various example statement sentences in FIG. 3 may create respective statement sentence node accordingly.

The knowledge map 254 may comprise a plurality of statement sentence nodes. Each statement sentence node contains a statement sentence and a corresponding node relationship property. Here, the statement sentence may be also referred to as node content property. The node relationship property may comprise at least one of an inter-node causation relationship property, a node topic category property, and an inter-node topic correlation property.

The inter-node causation relationship property of a statement sentence node is a node relation property that indicates whether the statement sentence node has a causation relationship with other statement sentence nodes. For example, the statement sentence node "Birds have wings" 302 and the statement sentence node "Birds can fly" 303 in FIG. 3 have a causation relationship, wherein "birds have wings" 302 is the premise of the causation relationship, that is, the cause, and "Birds can fly" 303 is the conclusion of the causation relationship, that is, the result. In one implementation, for the causation relationship between the nodes, a causation relationship pair (birds have wings, birds can fly) may be used to represent the property value, wherein the former element is the premise and the latter element is the conclusion. In another implementation, for the above-mentioned inter-node causation property, the expression "Start="birds have wings", End="birds can fly"" may also be used to represent the property value. In the case where the statement sentence is represented by a number, for example, assuming that the statement sentence "birds have wings" is numbered "3100" in the set of statement sentences, and the number of "birds can fly" is "3121", the above expression may be modified to "Start=3100, End=3121".

The node topic category property of a statement sentence node is a node relationship property that indicates which statement sentence nodes belongs to the same topic as the statement sentence node. For example, the statement sentence nodes in FIG. 3, "Birds have wings" 302, "Birds can fly" 303, "Birds can't fly" 304, "Birds eat insects" 305, and "Many birds eat insects" 306 all involve a topic of bird, and belong to a same topic category. In one implementation, topic clustering may be performed on the statement sentence nodes belonging to the same topic to obtain a corresponding topic, such as "bird", and then the topic "bird" is used as the property value of the topic category property. Alternatively, in another implementation, the topic cluster may be numbered and then the number may be used as the property value of the topic category property.

The inter-node topic correlation property of a statement sentence node is a node relationship property that indicates which topic categories have a correlation with the topic category of the statement sentence node. For example, in FIG. 3, the statement sentence nodes "birds have wings" 302, "birds can fly" 303, "birds can't fly" 304, "birds eat insects" 305 and "many birds eat insects" 306 all involve a topic of bird, and belong to the category of the topic of bird. However, the above five statement sentence nodes may be subdivided into sub-categories, such as the sub-category "Birds Fly" and the sub-category "Birds Eat Insects". Since both subcategories belong to the same parent category "bird", there is a topical correlation between the topics involved in the statement sentence nodes in the two subcategories. The property values for the inter-node topic correlation property may be characterized in the same manner as the node topic category property.

Further, in an implementation, the node relationship property may also comprise an inter-node synonym relationship property. The inter-node synonym relationship property of a statement sentence node is a node relationship property used to indicate that which statement sentence nodes have an identical or similar semantics as that of the statement sentence node. For example, the statement sentence nodes "birds eat insects" 305 and "many birds eat insects" 306 in FIG. 3 have a synonymous relationship. The property value of an inter-node synonymous relationship property may be characterized by the statement sentence itself, or by the number of the statement sentence node.

Further, in an implementation, the node relationship property may also comprise a node standpoint property. The node standpoint property of a statement sentence is a node relationship property used to indicate the standpoint of the statement sentence node for the related topic. The standpoint may include a neutral standpoint, a positive standpoint, and a negative standpoint. For example, the standpoint of the statement sentence nodes "Birds can fly" 303, "Birds eat insects" 305 and "Many birds eat insects" 306 in FIG. 3 is a positive standpoint, and the standpoint of the statement sentence node "Birds can't fly" 304 is a negative standpoint.

The chat bot system 200 may comprise a module set 260 which is a collection of functional modules that can be operated by the core processing module 220 to generate or obtain responses.

The module set 260 may comprise a semantic analysis module 261, a semantic matching module 262, a sentence node obtaining module 263, and a sentence conversion module 264. According to an embodiment of the present disclosure, the semantic analysis module 261 may be configured to perform semantic and intention analysis on a user's session information to determine a statement sentence message and a corresponding message processing parameter that are associated with the user's session information. According to an embodiment of the present disclosure, the semantic matching module 262 may be configured to find, from the knowledge map, one or more first statement sentence nodes that are semantic-matched with the statement sentence message. According to an embodiment of the present disclosure, the statement node obtaining module 263 may be configured to obtain, from the knowledge map, one or more second statement sentence nodes indicated by the node relationship property of the one or more first statement sentence nodes corresponding to the message processing parameter. According to an embodiment of the present disclosure, the statement conversion module 264 may be configured to convert statement sentences of the one or more second statement sentence nodes into a response.

The module set 260 may also comprise a sentence extraction module 265 and a sentence relationship analysis module 266. According to an embodiment of the present disclosure, the sentence extraction module 265 may be configured to extract, from webpage texts, statement sentences for building a knowledge map. According to an embodiment of the present disclosure, the sentence relationship analysis module 266 may be configured to analyze the sentence relationship between the extracted statement sentence and other statement sentences and/or the standpoint of the extracted statement sentence, so as to determine various node relationship properties of the corresponding statement sentence node.

The responses determined by the core processing module 220 may be provided to a response queue or response cache 234. For example, the response cache 234 may ensure that a sequence of responses may be displayed in a pre-defined time stream. Assuming that, for a message, there are no less than two responses determined by the core processing module 220, then a time-delay setting for the responses may be necessary. For example, if a message input by the user is "Why can birds fly?", two responses may be determined, such as, a first response "Because birds have wings" and a second response "Bird flapping wings will produce lift". In this case, through the response cache 234, the chat bot may ensure that the first response is provided to the user immediately. Further, the chat bot may ensure that the second response is provided in a time delay, such as 1 or 2 seconds, so that the second response will be provided to the user 1 or 2 seconds after the first response. As such, the response cache 234 may manage the to-be-sent responses and appropriate timing for each response.

The responses in the response queue or response cache 234 may be further transferred to the UI 210 such that the responses may be displayed to the user in the chat window.

It should be appreciated that all the elements shown in the chat bot system 200 in FIG. 2 are exemplary, and depending on specific application requirements, any shown elements may be omitted and any other elements may be involved in the chat bot system 200.

Figure 4:
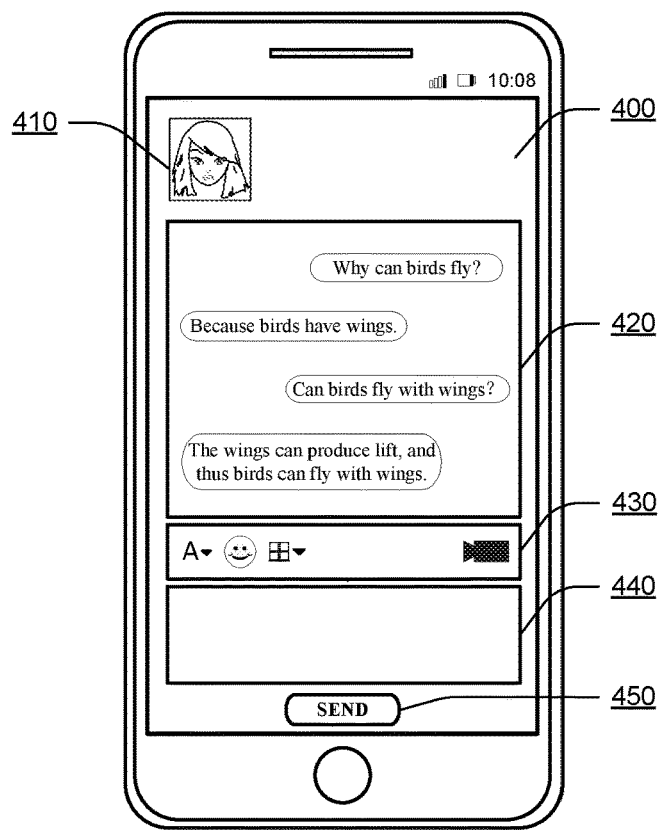
FIG. 4 illustrates an exemplary user interface according to an embodiment.

FIG. 4 illustrates an exemplary user interface 400 according to an embodiment.

The user interface 400 is included in a terminal device, and may comprise a chat bot icon 410, a presentation area 420, a control area 430 and an input area 440. The chat bot icon 410 may be a photo or picture representing the chat bot. The presentation area 420 displays a chat window that contains messages and responses in a session between a user and the chat bot. The control area 430 includes a plurality of virtual buttons for the user to perform message input settings. For example, the user may select to make a voice input, attach image files, select emoji symbols, make a screenshot of the current screen, etc. through the control area 430. The input area 440 is used by the user for inputting messages. For example, the user may type text through the input area 440. The user interface 400 may further comprise a virtual button 450 for confirming to send input messages. If the user touches the virtual button 450, the messages input in the input area 440 may be sent to the presentation area 420.

It should be appreciated that all the elements and their layout shown in FIG. 4 are exemplary. Depending on specific application requirements, the user interface in FIG. 4 may omit or add any elements, and the layout of the elements in the user interface in FIG. 4 may also be changed in various approaches.

Figure 5:
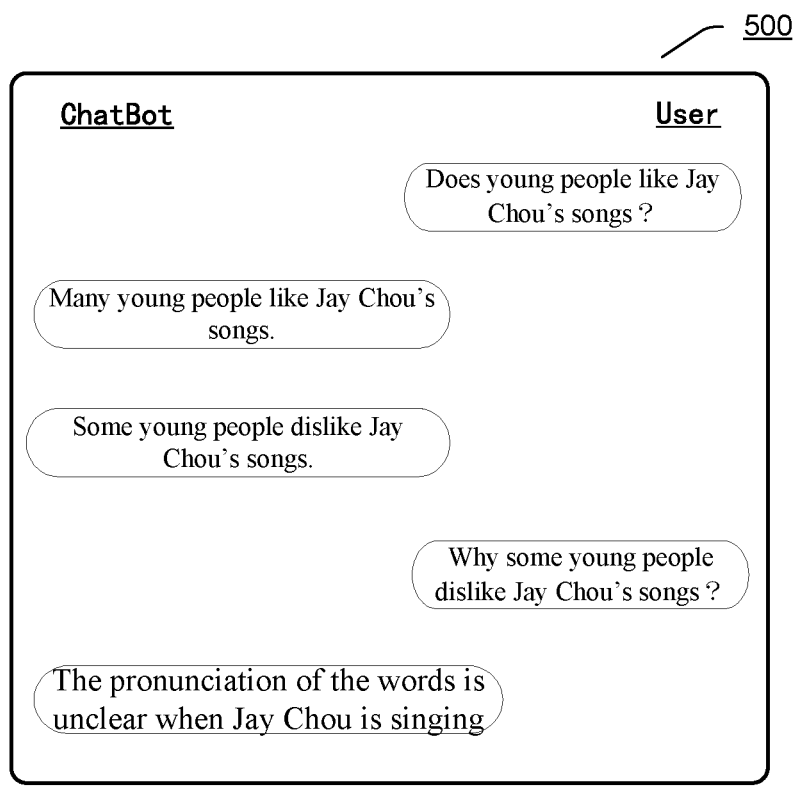
FIG. 5 illustrates an exemplary chat window according to an embodiment.

FIG. 5 illustrates an exemplary chat window 500 according to an embodiment. The chat window 500 shows an exemplary chat stream in which a chat bot may utilize a knowledge map based on statement sentences to make a QA session with a user.

When the user enters a message "Does young people like Jay Chou's songs?" to indicate that the user wants to know if the young person likes Jay Chou's song, the chat bot may retrieve the statement sentences "Many young people like Jay's songs" and "Some young people dislike Jay's songs" of the corresponding statement sentence nodes using the knowledge map based on statement sentences and make a response with such statement sentences. The user may then enter a message "Why do some young people dislike Jay Chou's songs?". The chat bot may find, in the knowledge map, a statement sentence "The pronunciation of the words is unclear when Jay Chou is singing" using the inter-node causation relationship property, and respond the user with this statement sentence.

Figure 6:
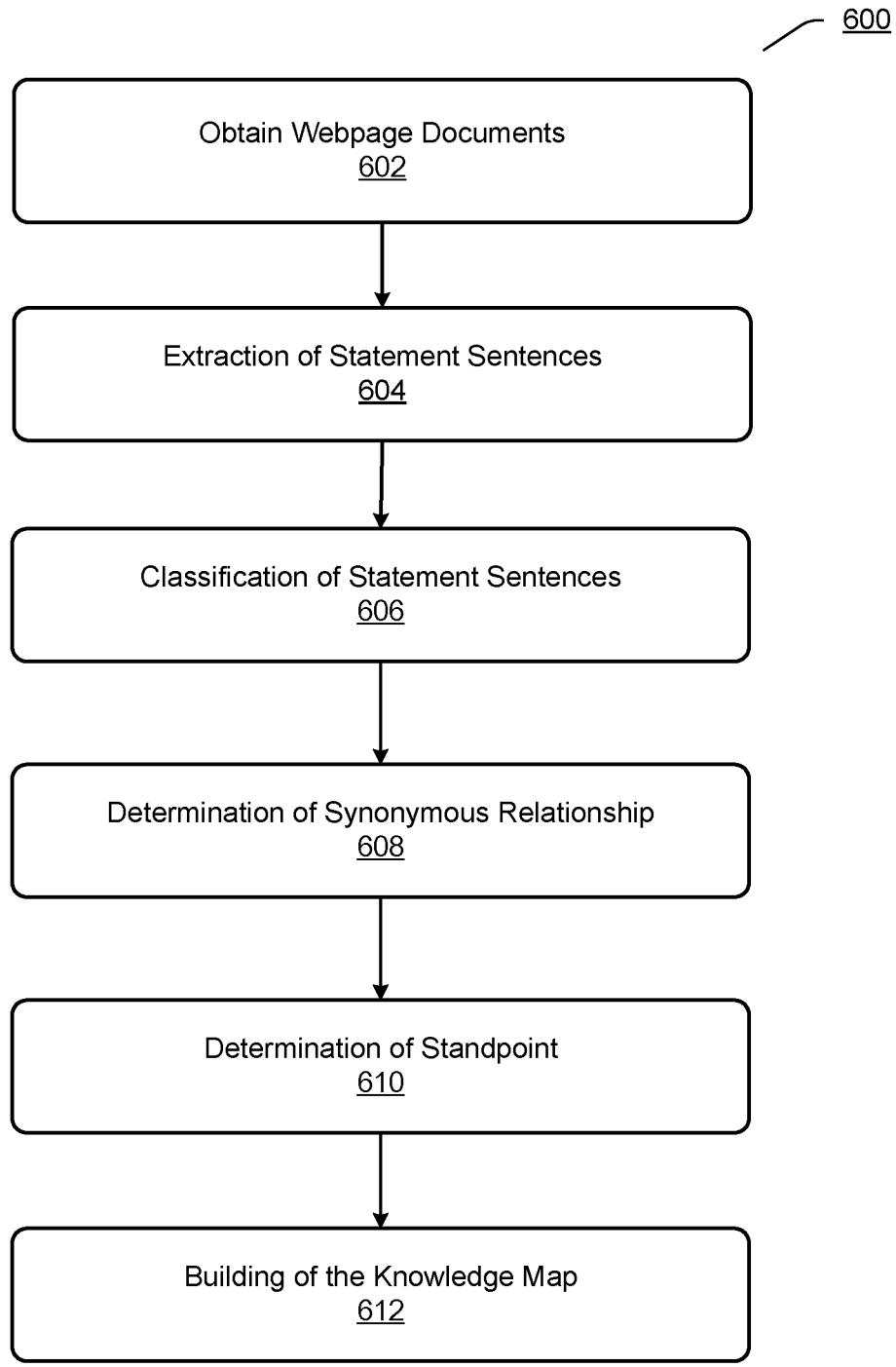
FIG. 6 illustrates a flow chart of a process for building a knowledge map according to an embodiment.

FIG. 6 illustrates a flow chart of a process for building a statement sentence-based knowledge map according to an embodiment.

At 602, webpage documents used to build the knowledge map are obtained. The webpage documents may be, for example, webpage documents obtained in real time from a public network resource, or may be webpage documents stored locally. For example, the obtained webpage document is an exemplary webpage document shown in FIG. 7, "many young people like Jay Chou's songs because Jay Chou's songs have a strong sense of rhythm. In addition, Jay Chou's stage fan is very cool, and thus young people like Jay Chou's songs. In addition, Jay Chou's handsome look is also a reason why young people like Jay Chou's songs. Because the pronunciation of the words is unclear when Jay Chou is singing, some young people dislike Jay Chou's songs".

At 604, statement sentence pairs having a causation relationship are extracted from the obtained webpage documents. One statement sentence in a statement sentence pair is a premise statement sentence, that is, a statement sentence indicating a cause of the causation relationship, and another statement sentence is a conclusion statement sentence, that is, a statement sentence indicating a conclusion of the causation relationship.

For example, for the webpage document shown in FIG. 7, after the extraction operation at 604, the obtained statement sentence pairs may include: (Jay Chou's songs have a strong rhythm, many young people like Jay Chou's songs); (Jay Chou's stage fan is very cool, young people like Jay Chou's songs); (Jay Chou's handsome look, young people like Jay Chou's songs); and (The pronunciation of the words is unclear when Jay Chou is singing, some young people dislike Jay Chou's songs).

Figure 8:
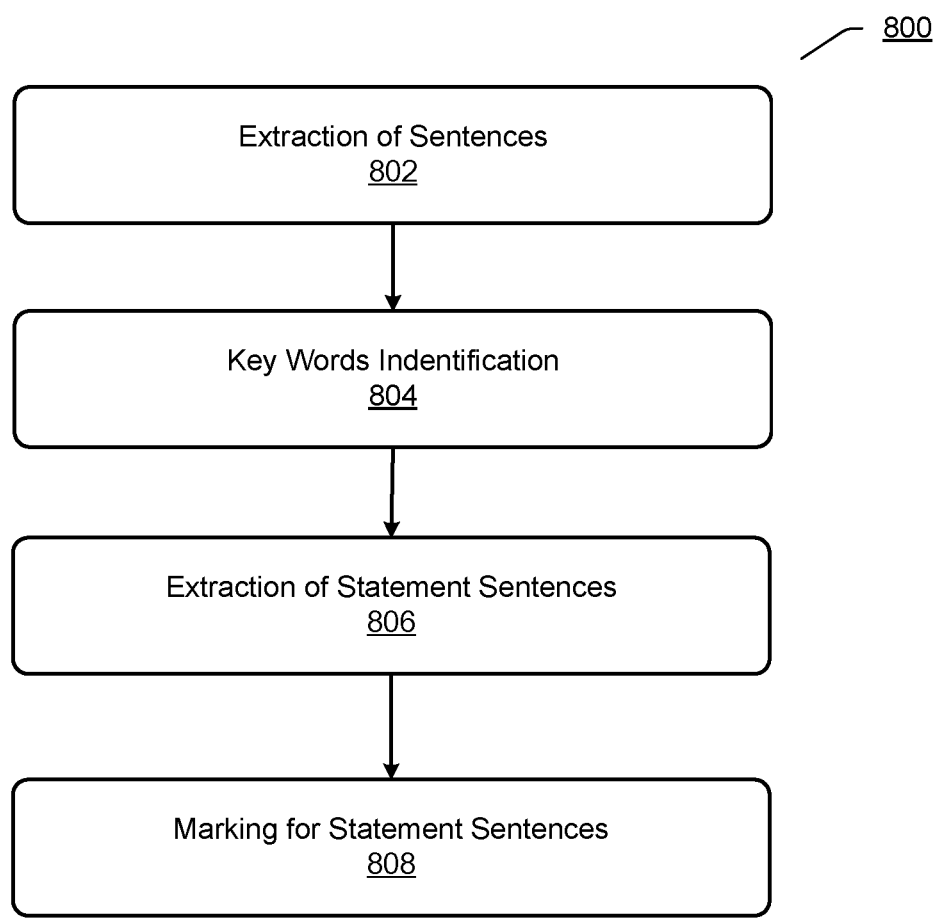
FIG. 8 illustrates a flow diagram of a process for extracting statement sentence pairs having a causation relationship from a webpage document according to an embodiment.

FIG. 8 illustrates an exemplary process 800 for extracting statement sentence pairs having a causation relationship from a webpage document according to an embodiment.

At 802, one or more single sentences are extracted from the webpage document. That is, the webpage document is divided in units of sentences. For example, the webpage document in FIG. 7 may be divided into the following four sentences: "Many young people like Jay Chou's songs because Jay Chou's songs have a strong sense of rhythm"; "The stage fan of Jay Chou's singing is very cool, and thus young people like Jay Chou's songs."; "Jay Chou's handsome look is also a reason why young people like Jay Chou's songs"; and "Because the pronunciation of the words is unclear when Jay Chou is singing, some young people dislike Jay Chou's songs."

At 804, for each extracted single sentence, it is identified whether the single sentence includes a feature word for characterizing a causation relationship, such as: "because", "so", "cause", "cause", "reason", etc. In an implementation, the single sentence may be semantically segmented to obtain words, and then each word is compared to a feature word database. If there is a word matching a certain feature word in the feature word database, the single sentence is considered to contain a feature word for characterizing a causation relationship. If there is no word matching all of the feature words in the feature word database, the single sentence is considered not to contain a feature word for characterizing a causation relationship. In another implementation, the causation relationship analysis model may also be utilized to perform the feature word identification process described above.

At 806, statement sentence pairs having a causation relationship are extracted from the single sentences identified as having a causation relationship. Here, the extraction of a sentence having a causation relationship is to take a content that is a premise or a cause of the causation relationship as a statement sentence, and take a content that is a conclusion of the causation relationship as another statement sentence. For example, the single sentence having a causation relationship identified in 804 may be divided into the following statement sentence pairs: (Jay Chou's songs have a strong rhythm, many young people like Jay Chou's songs); (Jay Chou's stage fan is very cool, young people like Jay Chou's songs); (Jay Chou's handsome look, young people like Jay Chou's songs); and (The pronunciation of the words is unclear when Jay Chou is singing, some young people dislike Jay Chou's songs).

At 808, marking for premise/conclusion are made for each statement sentence of the resulting statement sentence pairs. For example, the statement sentence "Jay Chou's songs have a strong sense of rhythm", "Jay Chou's stage fan is very cool", "Jay Jay's handsome look" and "the pronunciation of the words is unclear when Jay Chou is singing" are marked as premise statement sentences, and The statement sentences "Many young people like Jay Chou's songs", "young people like Jay Chou's songs" and "Some young people dislike Jay Chou's songs" are marked as conclusive statement sentences.

In addition, optionally, according to an embodiment, similar to extraction for a single sentence, among a plurality of sentences in the webpage document, whether there is a causation relationship between each two sentences may be determined using keyword recognition or using a method of machine learning, thus completing the extraction of the statement sentence pairs having a causation relationship.

After the statement sentence pairs are obtained as above, at 606, the statement sentences of the resulting statement sentence pair are clustered according to the topic. In an implementation, the topic clustering of statement sentences may be performed using various clustering algorithms in the art. The clustering algorithm may include, for example, one of the following algorithms: partitioning methods, hierarchical methods, density-based methods, grid-based methods and model-based methods. For each type of statement sentence, various suitable methods may be used for marking, for example, predetermined marking rules may be used for marking, such as using a number. In another implementation, each topic category may be further subdivided to obtain a subtopic category for the topic category. In this case, there is a correlation between the subtopic categories after the subdivision, and the topic correlation information is marked on the corresponding statement sentences. Alternatively, a plurality of topic types may be further clustered to obtain a parent topic category for the plurality of topic categories. In this case, there is a correlation between the plurality of topic categories, and the topic correlation information is marked on the corresponding statement sentences.

For example, the statement sentence nodes "Jay Chou's songs have a strong sense of rhythm", "Jay Chou's stage fan is very cool", "Jay Chou's handsome look", "the pronunciation of the words is unclear when Jay Chou is singing", "many Young people like Jay Chou's songs", "young people like Jay Chou's songs" and "some young people dislike Jay Chou's songs" may be clustered into the topic category "Jay Chou" (parent topic category). Further, after subdivision, the statement sentence nodes "Jay Chou's stage fan is very cool" and "the pronunciation of the words is unclear when Jay Chou is singing" may be clustered into the topic category "singing of Jay Chou" (sub-topic category), "Jay Chou's handsome look" may be clustered into the topic category "Jay Chou's appearance" (sub-topic category), "Jay Chou's songs have a strong sense of rhythm", "Many young people like Jay Chou's songs", "young people like Jay Chou's songs" and "some young people dislike Jay Chou's songs" may be clustered into the topic category "Jay Chou's Songs" (sub-topic category). Here, there is a topic correlation between statement sentences "Jay Chou's stage fan is very cool", "the pronunciation of the words is unclear when Jay Chou is singing" and statement sentences "Jay Chou's songs have a strong sense of rhythm", "Many young people like Jay Chou's songs", "young people like Jay Chou's songs", "some young people dislike Jay Chou's songs", and there is a topical relevance between statement sentences "Jay Chou's stage fan is very cool", "the pronunciation of the words is unclear when Jay Chou is singing" and statement sentence "Jay Chou's handsome looks."

At 608, the synonymous relationship between statement sentences is determined. The synonymous relationship may be determined using a semantic analysis module. For example, there is a synonymous relationship between statement sentences "many young people like Jay's songs" and "young people like Jay Chou's songs".

At 610, the standpoint of statement sentences on the topic is determined, for example, for the topic, the statement sentence is a positive standpoint, a negative standpoint or a neutral standpoint. The standpoint of a statement sentence may be determined using a semantic analysis module. For example, the standpoints of statement sentences "many young people like Jay Chou's songs", "young people like Jay Chou's songs" are positive standpoints; and the standpoint of statement sentence "some young people dislike Jay's songs" is a negative standpoint.

At 612, each statement sentence node in the knowledge map is created based on the statement sentence determined above and its inter-node causation relationship property, node topic category property, inter-node topic correlation property, inter-node synonymous relationship property and node standpoint property, so as to build the knowledge map. According to one embodiment, the knowledge map may store various statement sentence nodes created as above in a table-based storage manner or a graph-based storage manner.

In addition, optionally, in another implementation, a statement sentence node-complete sentence mapping may also be stored in the knowledge map, where the mapping is used to indicate a mapping relationship between a statement sentence node and the complete sentence to which the statement sentence belongs in the webpage document. For example, there is a mapping relationship between the statement sentence nodes "many young people like Jay's songs", "Jay Chou's songs have a strong sense of rhythm" and the complete sentence "many young people like Jay Chou's songs, because Jay Chou's songs have a strong rhythm". By using the statement sentence node-complete sentence mapping, after finding the statement sentence node, the corresponding complete sentence may be further found, so that the complete sentence may be given when the response is provided.

Figure 9:
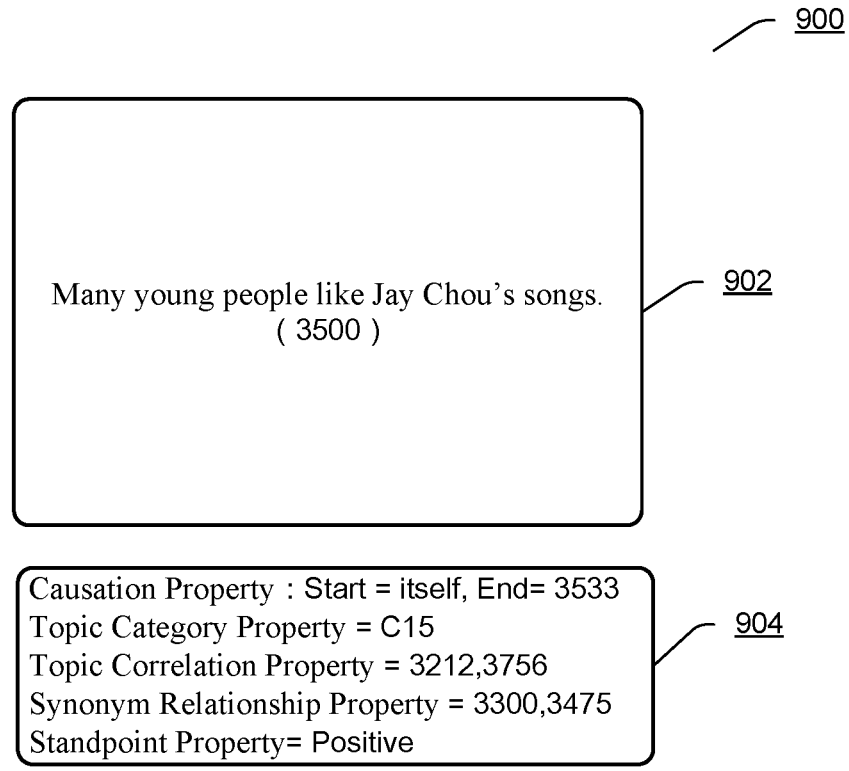
FIG. 9 illustrates an exemplary knowledge map according to an embodiment.

FIG. 9 illustrates an exemplary statement sentence node 900 of a knowledge map according to an embodiment. As shown in FIG. 9, the statement sentence node 900 includes a statement sentence 902 "many young people like Jay's songs" and a node relationship property 904 of the statement sentence 902. In an implementation, the knowledge map has a plurality of statement sentence nodes, and each statement sentence node may be represented by a number, for example, using its sequence number in the knowledge map. For example, the statement sentence node 900 may be marked with a number 3500.

The node relationship properties shown in FIG. 9 include an inter-node causation property, a node topic category property, an inter-node topic correlation property, an inter-node synonym relationship property, and a node standpoint property. Here, each node relationship property may be represented with a property name and a property value. For example, the property name of the inter-node causation relationship property is "causation relationship property", or may be represented by the corresponding Chinese phonetic abbreviation "YGGXSX" or "R1". The property value of the inter-node causation relationship property may be expressed, for example, as "Start=itself, End=3533", which indicates that there is a causation relationship between the statement sentence node 3500 and another statement sentence node 3533 in the knowledge map, and the statement sentence node 3500 is a premise, and the statement sentence node 3533 is a conclusion. If the statement sentence node does not have a corresponding statement sentence node having a causation relationship, the property value is expressed as "Start=itself or NULL, End=NULL".

The property name of the node topic category property may be "topic category property" or represented by the corresponding Chinese phonetic abbreviation "HTLBSX" or "R2". The property value of the node topic category property may be, for example, "C15", which indicates that the statement sentence node 3500 belongs to the topic labeled "C15", that is, the category numbered 15. Alternatively, the property value of the node topic category property may be represented with a topic name, such as "Jay Chou".

The property name of the inter-node topic correlation property may be "topic correlation property" or represented by the corresponding Chinese phonetic abbreviation "HTXGXSX" or "R3". The property value of the inter-node topic correlation property may be, for example, "3212, 3756", which indicates that there is a topical correlation between the statement sentence node 3500 and the statement sentence nodes 3212, 3756. The property name of the inter-node synonymous relationship property may be "synonymous relationship property", or represented by the corresponding Chinese phonetic abbreviation "TYGXSX" or "R4", and its property value is "3300, 3475", which represents a statement sentence Node 3500 is synonymous with statement sentence nodes 3300 and 3475. The property name of the node standpoint property may be "standpoint property" or represented by the corresponding Chinese phonetic abbreviation "LCSX" or "R5". The property value of the node standpoint property may be "positive", which indicates that the standpoint of the statement sentence node 3500 for the topic is a positive standpoint.

In another implementation, the node relationship property may comprise at least one of an inter-node causation relationship property, a node topic category property, an inter-node topic correlation property, an inter-node synonym relationship property, and a node standpoint property. Accordingly, the corresponding steps of the node relationship property being not included may be omitted in the flowchart of the process for building the knowledge map shown in FIG. 6.

Figure 10:
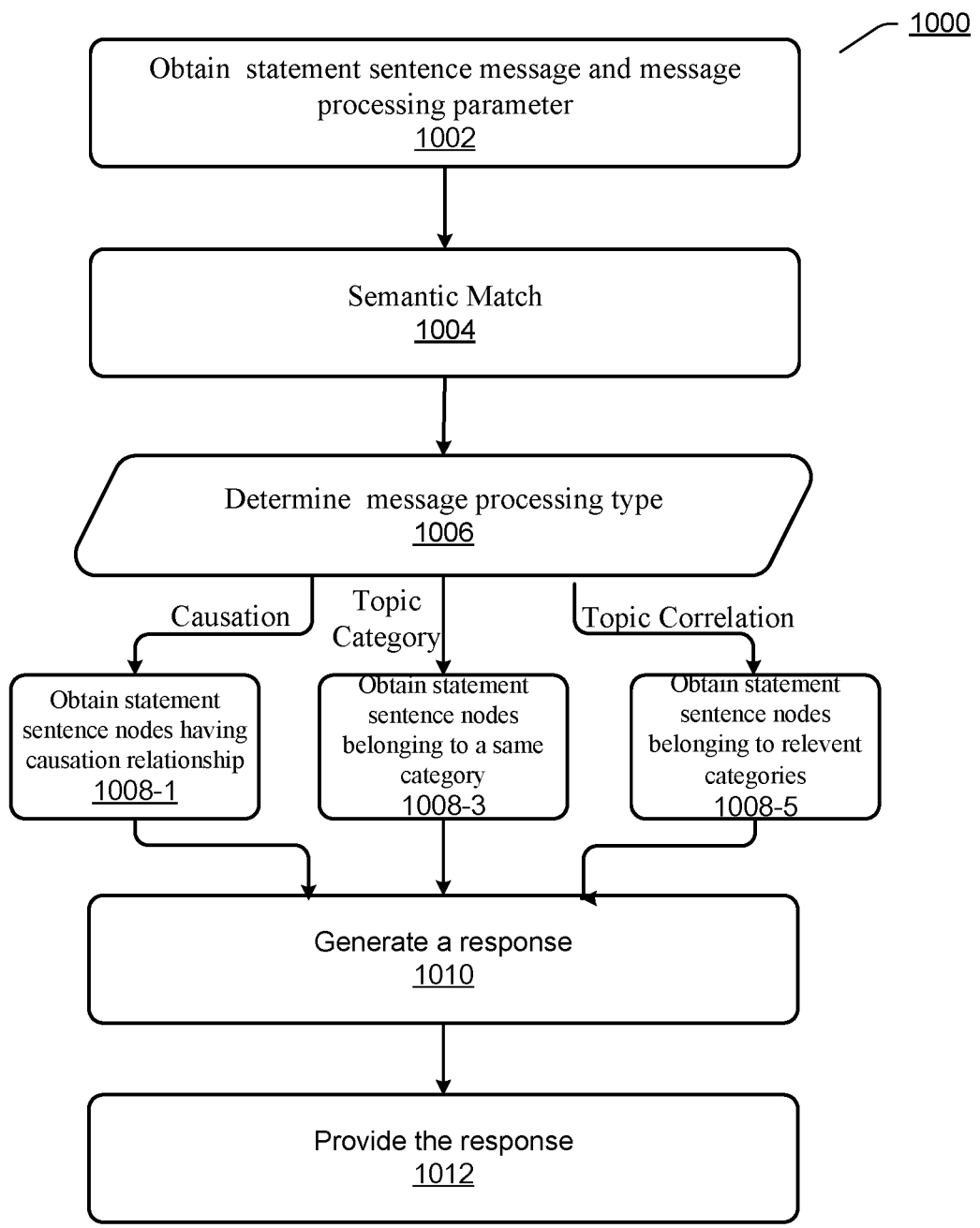
FIG. 10 illustrates a flow diagram of a method for processing a message according to an embodiment.

FIG. 10 illustrates a flow diagram of a method 1000 for processing a message according to an embodiment.

At 1002, a statement sentence message and a message processing parameter associated with a user's session message are obtained. The obtaining of the statement sentence message and the message processing parameter will be described below with reference to FIG. 11.

Figure 11:
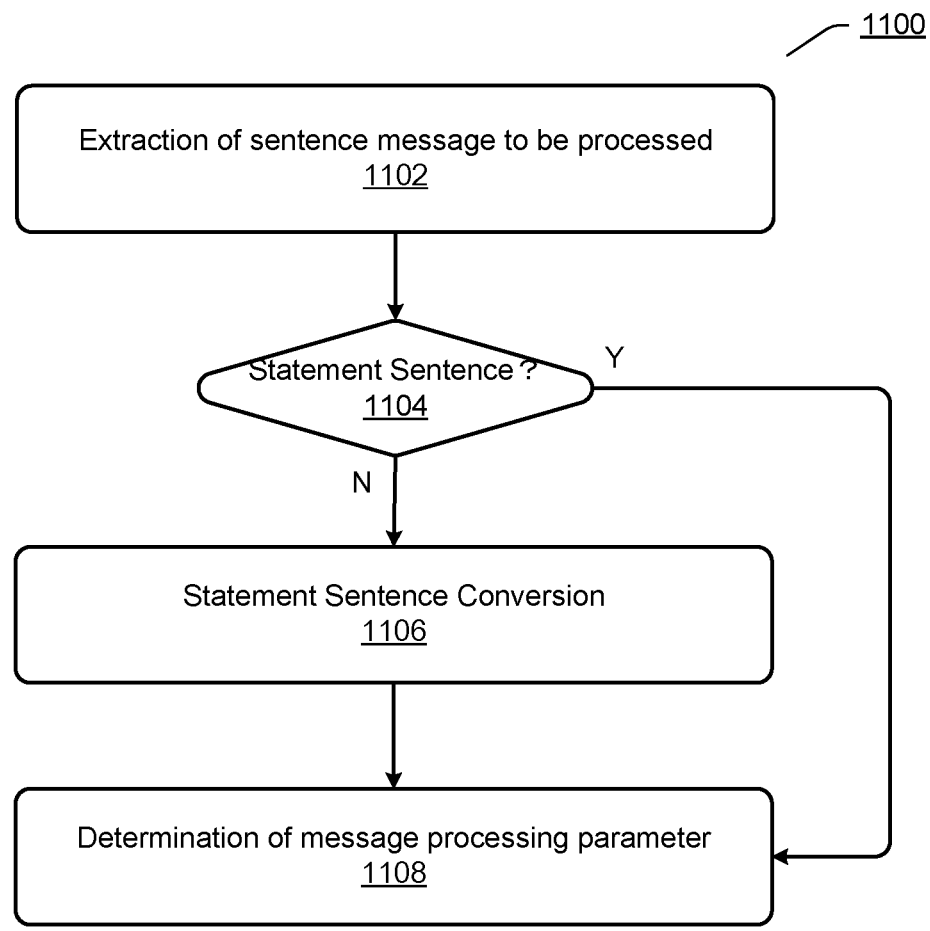
FIG. 11 illustrates an exemplary process for obtaining a statement sentence message and a message processing parameter based on a user's session message according to an embodiment.

FIG. 11 illustrates an exemplary process 1100 for obtaining a statement sentence message and a message processing parameter based on a user's session message according to an embodiment.

At 1102, a sentence message to be processed is extracted from the user's session message. According to an embodiment, the above extraction process may be accomplished using a machine translation model.

At 1104, it is determined whether the sentence message to be processed is a statement sentence message. If the sentence message to be processed is a statement sentence message, then the process proceeds to 1108. If the sentence message to be processed is not a statement sentence message, then the process proceeds to 1106.

At 1106, the sentence message to be processed is converted into a statement sentence message. According to an embodiment, the above sentence message conversion process may be accomplished, for example, using a machine translation model of Sequence-to-Sequence.

At 1108, an intention analysis on the user's session message is performed to determine a message processing parameter of the sentence message to be processed. For example, assuming that the user's session message is "Why does young people like Jay Chou's song?", by performing an intention analysis on the above session message, it is determined that the user wants to find the reason why young people like Jay Chou's songs, so that the message processing parameter is determined to perform a message processing based on a causation relationship, and the message processing is to find the premise of the conclusion "Young people like Jay Chou's songs". The operation at 1108 may be implemented using an intention analysis module. For example, assuming that the user's session message is "Can you introduce the benefits of automatic driving?", by performing an intention analysis on the above session message, it is determined that the user wants to find a statement about the automatic driving's benefits, and thus the message processing parameter is determined to perform a message processing based on the topic category. For example, suppose that the user's session message is "Can you introduce other knowledge rather than automatic driving being easier", and by performing an intention analysis on the above-mentioned session message, it is determined that the user wants to find statement sentences having a topical correlation with statement sentence "Automatic driving is easier".

After obtaining the statement sentence message, at 1004, one or more first statement sentence nodes that are semantic-matched with the statement sentence message are determined in the knowledge map. The semantic-matching may be implemented using, for example, a paraphrasing model, a natural language inference model, and the like. The operation at 1004 may be implemented using the semantic matching module mentioned in FIG. 2. Here, the determined first statement sentence nodes may be all or part of the statement sentence nodes that are semantic-matched with the statement sentence message. For example, the part of the semantic-matched statement sentence nodes may be filtered using the authority and/or timeliness described below.

Next, at 1006, the type of a message processing indicated by the obtained message processing parameter is determined, i.e., a node relationship property for querying in the knowledge map is determined. The message processing parameter includes at least one of the following message processing parameters: a message processing parameter based on causation relationship; a message processing parameter based on topic categories; a message processing parameter based on topic correlation; and a message processing parameter based on standpoint. Here, the causation relationship-based message processing parameter is used to indicate that the statement sentence that is the premise or conclusion of the statement sentence message is obtained. The topic category-based message processing parameter is used to indicate that a statement sentence that belongs to the same topic category as the statement sentence message is obtained. The topic correlation-based message processing parameter is used to indicate that a statement sentence having a topic correlation with a topic category to which the statement sentence message belongs is obtained.

At 1008, one or more second statement sentence nodes, which are indicated by the determined node relationship property of the one or more first statement sentence nodes, are obtained from the knowledge map. Similarly, the obtained one or more second statement sentence nodes may be all or part of the statement sentence nodes indicated by the determined node relationship property of the one or more first statement sentence nodes. For example, the part of the determined second statement sentence nodes is filtered using the authority and/or timeliness described below.

Specifically, when the obtained message processing parameter indicates that the message processing is performed based on the causation relationship, for example, when the obtained message processing parameter indicates that the premise sentence nodes or the conclusion statement sentence nodes corresponding to the one or more first statement sentence nodes are obtained, at 1008-1, one or more premise sentence nodes or the conclusion statement sentence nodes corresponding to the one or more first statement sentence nodes are obtained from the knowledge map based on the matched inter-node causation property of the one or more first statement sentence nodes, as one or more second statement sentence nodes.

When the obtained message processing parameter indicates that the message processing is performed based on the topic category, for example, when the obtained message processing parameter indicates that statement sentence nodes that belong to the same topic as the one or more first statement sentence nodes are obtained (e.g., topic creation or topic recommendation), at 1008-3, one or more statement sentences, which belong to the same topic category as the matched one or more first statement sentence nodes, are obtained from the knowledge map, as the one or more second statement sentence nodes.

When the obtained message processing parameter indicates that the message processing is performed based on topic correlation, for example, when the obtained message processing parameter indicates that one or more statement sentence nodes having a topical correlation with one or more first statement sentence nodes are obtained, at 1008-5, one or more statement sentence nodes, which belong to a same as that of the matched one or more first statement sentence nodes, are obtained from the knowledge map, as the one or more second statement sentence nodes.

Then, at 1010, a response is generated based at least in part on statement sentences of the one or more second statement sentence nodes. In an implementation, statement sentences of the one or more second statement sentence node are directly made as the response. In another implementation, the statement sentences of the one or more second statement sentence may be adaptively transformed as the response. For example, the adaptive transformation may be performed based on the session message and/or the context of the session message. If the session message entered by a user is "Does everyone like Jay Chou's singing?", the queried statement sentences of the second statement sentence nodes are "Many young people like Jay Chou's songs" and "Some young people dislike Jay Chou's songs", after the statement sentence "many young people like Jay Chou's songs" is displayed as the first response, "some young people dislike Jay Chou's songs" is transformed to "but some young people dislike Jay Chou's songs" as the second response, so that the chat robot's reply is logically more natural and coherent.

At 1012, the generated response is provided to the user. Here, the response may be provided to the user in a text format, a voice format, an image format, or a video format.

In addition, optionally, the obtained message processing parameter may further indicate that the message processing is performed based on the standpoint, for example, the obtained message processing parameter indicates that statement sentences, the standpoint of which for the topic of the statement sentence message matches the node position parameter, are obtained. In this case, the message processing process shown in FIG. 10 needs to be modified. Specifically, after the one or more second statement sentence nodes are obtained at 1008 (e.g., 1008-1, 1008-3, and 1008-5), the node standpoint parameter for message processing is determined. The node standpoint parameter is used to indicate the standpoint of a statement sentence to be presented to the user. Next, one or more fourth statement sentence nodes that match the determined node standpoint parameter are obtained from the one or more second statement sentence nodes. Then, at 1010, a response is generated based on the obtained one or more fourth statement sentence nodes that match the determined node standpoint parameter.

According to an embodiment of the present disclosure, the node standpoint parameter is determined based on at least one of the following messages: the session message; a context message of the session message; a user's standpoint preference information; and a set standpoint processing rule.

In an implementation, the node standpoint parameter may be determined based on the user's session message. For example, assuming that the user's session message is "I like Jay Chou's songs very much", the node standpoint parameter is determined to be a positive standpoint. In an implementation, the node standpoint parameter may be determined based on the context information of the user's session message. For example, assuming that the user's session message is "Does young people like Jay Chou's songs?", and the context information of the session message indicates that the user doesn't like Jay Chou's songs, so that the node standpoint parameter is determined to be a negative standpoint. In another implementation, the node standpoint parameter may be determined based on a user's standpoint preference information. For example, assuming that the user's standpoint preference information indicates that the user likes Jay Chou, and thus the node standpoint parameter is determined to be a positive standpoint.

In another implementation, the node standpoint parameter may be determined based on a set standpoint processing rule. For example, assuming that the user's session message is "Everyone likes Jay Chou's songs", in this case, if the set standpoint processing rule is set to a neutral standpoint, the node standpoint parameter is determined to be a neutral standpoint. If the set standpoint processing rule is set to confront the user's standpoint, the node standpoint parameter is determined to be opposite to the user's standpoint. Here, the user's standpoint may be determined based on the user's session message, the context information of the session message, or the user's standpoint preference information. If the set standpoint processing rule is set to conform to the user, the node standpoint parameter is determined to be the same as the user's standpoint.

Optionally, in an implementation, the statement sentence node may also record at least one of the following properties: a source webpage address and a timestamp. In this case, the obtained one or more second statement sentence nodes may also be filtered before the response is provided.

Figure 12:
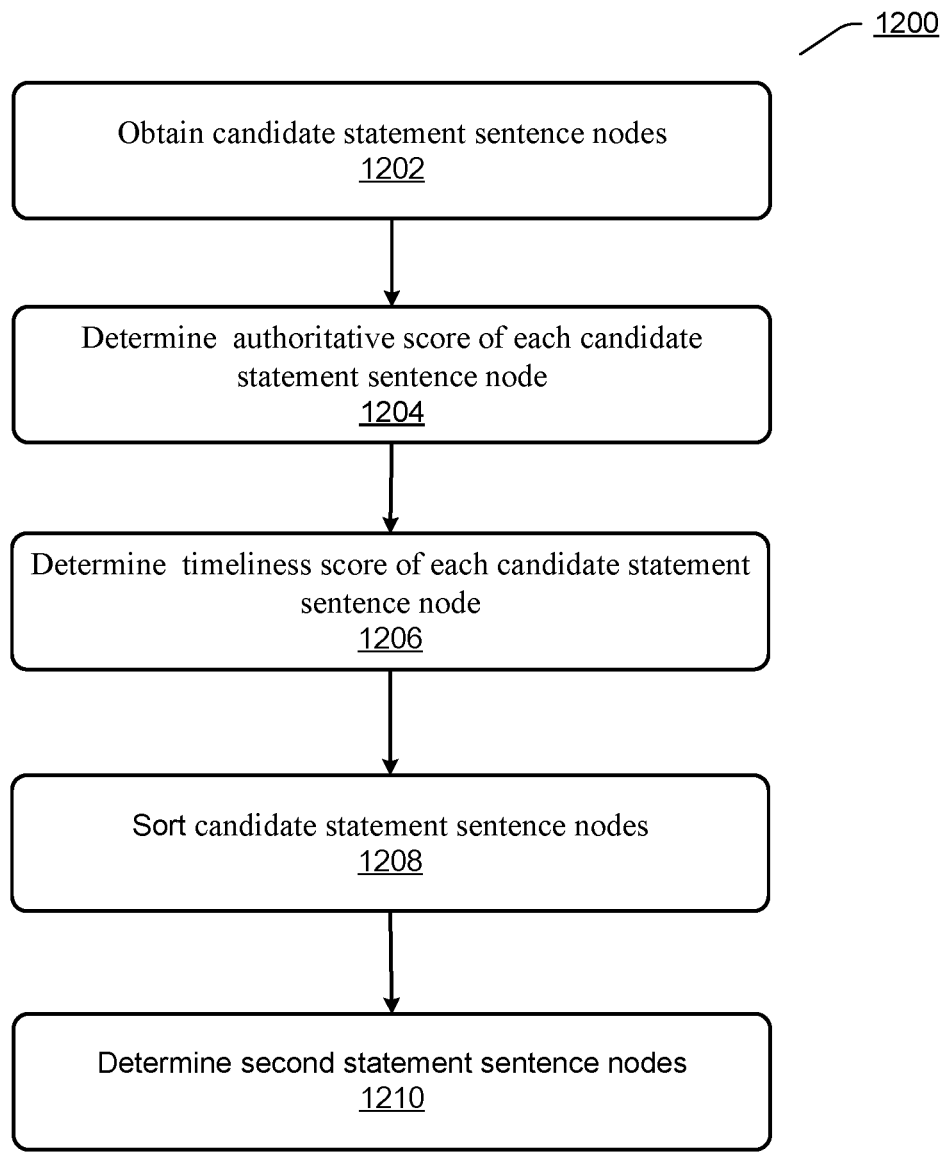
FIG. 12 illustrates an exemplary process for filtering statement sentence nodes according to an embodiment.

FIG. 12 illustrates an exemplary process for filtering statement sentence nodes according to an embodiment.

At 1202, candidate statement sentence nodes indicated by the node relationship property of the one or more first statement sentence nodes corresponding to the message processing parameter are obtained from the knowledge map. The operation at 1202 is the same as described above for that at 1008.

After obtaining the candidate statement sentence nodes, the candidate statement sentence nodes are sorted using the source webpage address and/or the timestamp of the obtained candidate statement sentence nodes. Specifically, in an implementation, at 1204, using the source webpage address of each candidate statement sentence node, the corresponding authoritative score is determined according to the authority of the web site corresponding to the source webpage address. The determination of the authoritative score may be implemented using a variety of applicable algorithms in the art. Next, at 1206, the timestamp information for each candidate statement sentence node is used to determine a corresponding timeliness score. The determination of the timeliness score may be implemented using various applicable algorithms in the art. Then, at 1208, based on the determined authoritative score, the timeliness score, and the corresponding authoritative score weight and timeliness score weight, the scores of the respective candidate statement sentence nodes are determined and sorted according to the respective scores. Here, the authoritative score weight and the time-sensitive score weight may be preset, or may be set according to a specific application scenario and/or the user's session information.

At 1210, the one or more second statement sentence nodes are determined from the sorted candidate statement sentence nodes. In an implementation, the candidate statement sentence nodes having a score greater than a predetermined score value may be determined as the second statement sentence nodes. In another implementation, the predetermined number of candidate statement sentence nodes with the highest ranking may be determined as the second statement sentence nodes. Alternatively, in another implementation, a predetermined percentage (e.g., 5%) of the highest ranked predetermined statement sentence nodes may be determined as the second statement sentence nodes.

Figure 13A:
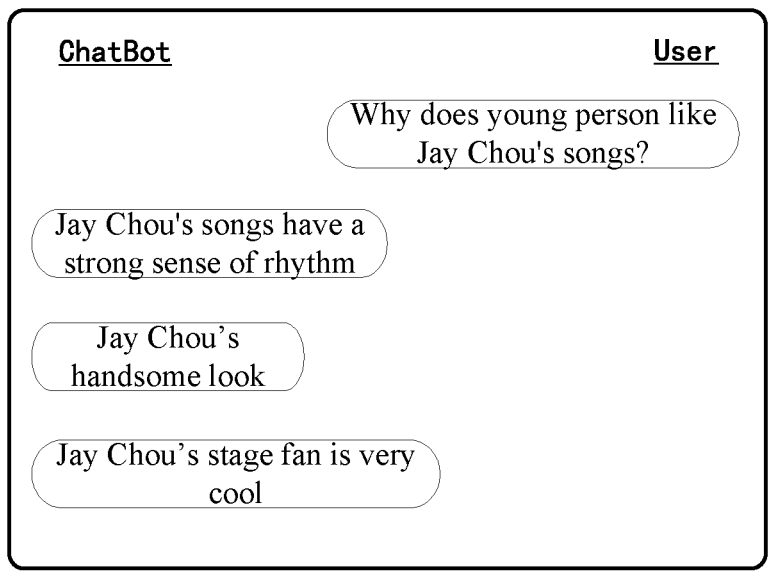
FIG. 13A illustrates a user interface for a response provided when the message processing parameter indicates acquisition of premise statement sentence nodes corresponding to a first statement sentence node according to an embodiment.

FIG. 13A illustrates a user interface for a response provided when the message processing parameter indicates acquisition of premise statement sentence nodes corresponding to a first statement sentence node according to an embodiment. As shown in FIG. 13A, the session message input by the user is "Why does young person like Jay Chou's songs?", and by performing the semantic analysis on the session message, the statement sentence message may be obtained as "Young people like Jay Chou's songs". The message processing parameter indicates statement sentences as the premise of the statement message are obtained. Based on the knowledge map, three responses are found: "Jay Chou's songs have a strong sense of rhythm", "Jay Chou's handsome look" and "Jay Chou's stage fan is very cool", and are displayed in the presentation area of the user interface in the terminal device.

Figure 13B:
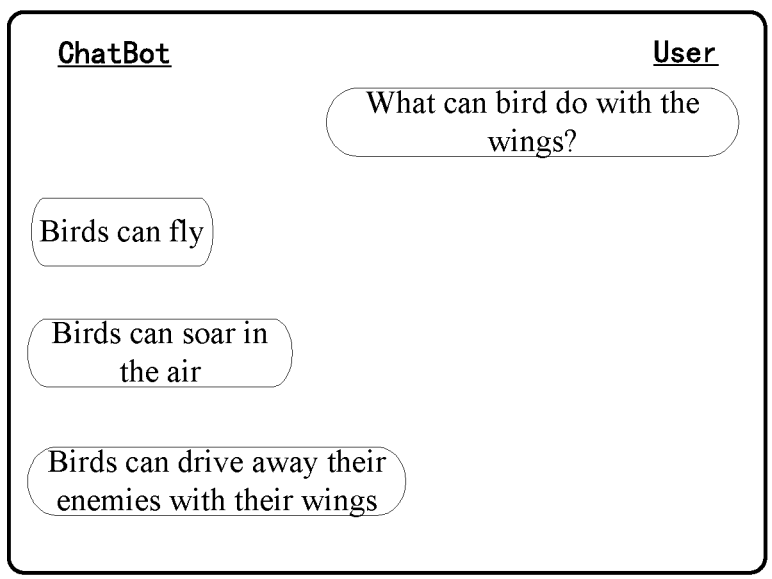
FIG. 13B illustrates a user interface for a response provided when the message processing parameter indicates acquisition of conclusion statement sentence nodes corresponding to a first statement sentence node according to an embodiment.

FIG. 13B illustrates a user interface for a response provided when the message processing parameter indicates acquisition of conclusion statement sentence nodes corresponding to a first statement sentence node according to an embodiment. As shown in FIG. 13B, the session message input by the user is "What can bird do with the wings?", and by performing the semantic analysis on the session message, the statement sentence message may be obtained as "Birds have wings". The message processing parameter indicates statement sentences as the conclusion of the statement message are obtained. Based on the knowledge map, three responses are found: "Birds can fly", "Birds can soar in the air" and "Birds can drive away their enemies with their wings", and are displayed in the presentation area of the user interface in the terminal device.

Figure 13C:
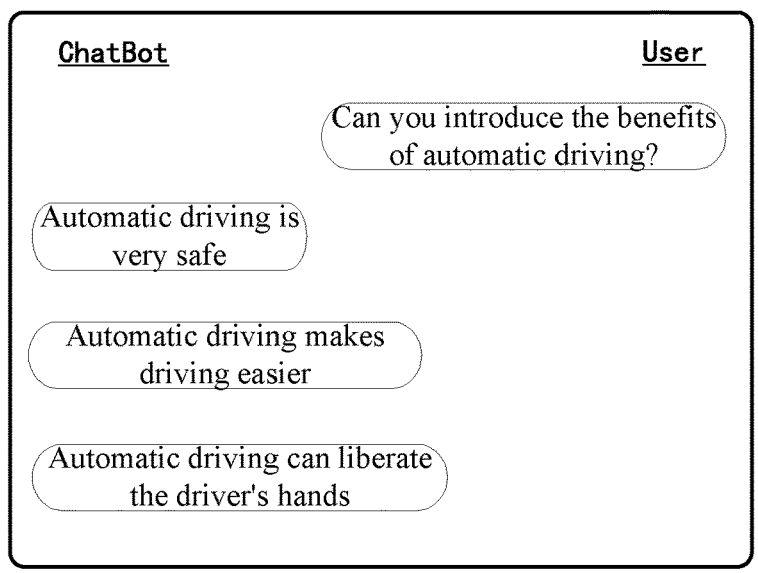
FIG. 13C illustrates a user interface for a response provided when the message processing parameter indicates acquisition of statement sentence nodes belonging to a same topic category as that of a first statement sentence node according to an embodiment.

FIG. 13C illustrates a user interface for a response provided when the message processing parameter indicates acquisition of statement sentence nodes belonging to a same topic category as that of a first statement sentence node according to an embodiment. As shown in FIG. 13C, the session message input by the user is "Can you introduce the benefits of automatic driving?", and by performing the semantic analysis on the session message, the statement sentence message may be obtained as "Automatic driving has benefits". The message processing parameter indicates that statement sentences belonging to the same topic category as the statement sentence message are obtained. Based on the knowledge map, three responses are found: "Automatic driving is very safe", "Automatic driving makes driving easier" and "Automatic driving can liberate the driver's hands", and are displayed in the presentation area of the user interface in the terminal device.

Figure 13D:
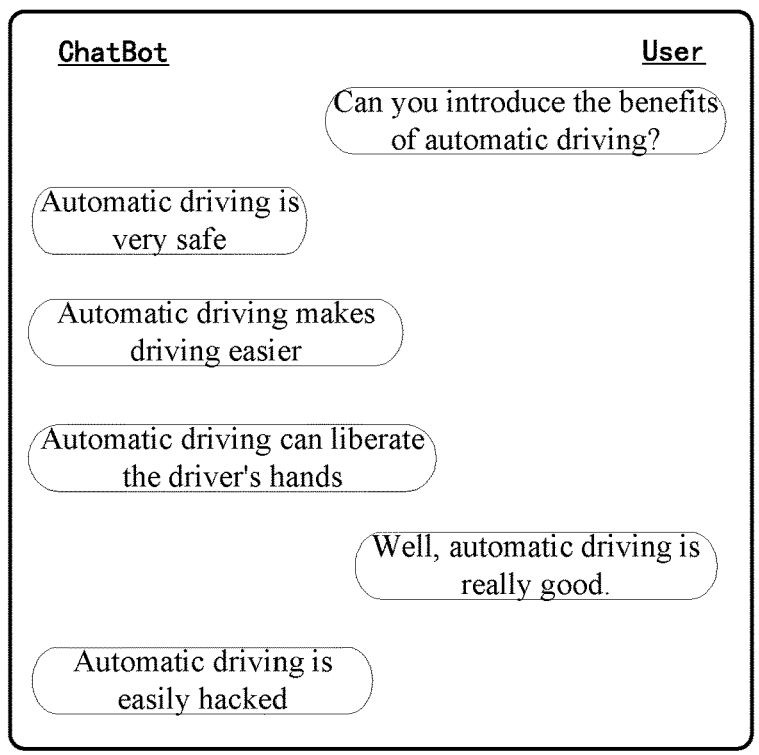
FIG. 13D illustrates a user interface for a response provided when the message processing parameter indicates acquisition of statement sentence nodes that have topic correlation with the topic category of a first statement sentence node according to an embodiment.

FIG. 13D illustrates a user interface for a response provided when the message processing parameter indicates acquisition of statement sentence nodes that have topic correlation with the topic category of a first statement sentence node according to an embodiment. As shown in FIG. 13D, the session message input by the user is "Can you introduce the benefits of automatic driving?", and by performing the semantic analysis on the session message, the statement sentence message may be obtained as "Automatic driving has benefits". The message processing parameter indicates that statement sentences belonging to the same topic category as the statement sentence message are obtained. Based on the knowledge map, three responses are found: "Automatic driving is very safe", "Automatic driving makes driving easier" and "Automatic driving can liberate the driver's hands", and are displayed in the presentation area of the user interface in the terminal device. After getting the above reply, assuming that the user continues to input "Well, automatic driving is really good." By analyzing this session message, it can be considered that the user has finished the previous inquiry for the same category information, and no other topic discussion requirements are issued. In this case, the chat bot may determine that the message processing parameter is to obtain a statement sentence having a topical correlation with the statement sentence message. Based on the knowledge map, a response "Automatic driving is easily hacked" is found and displayed in the presentation area of the user interface in the terminal device.

Figure 13E:
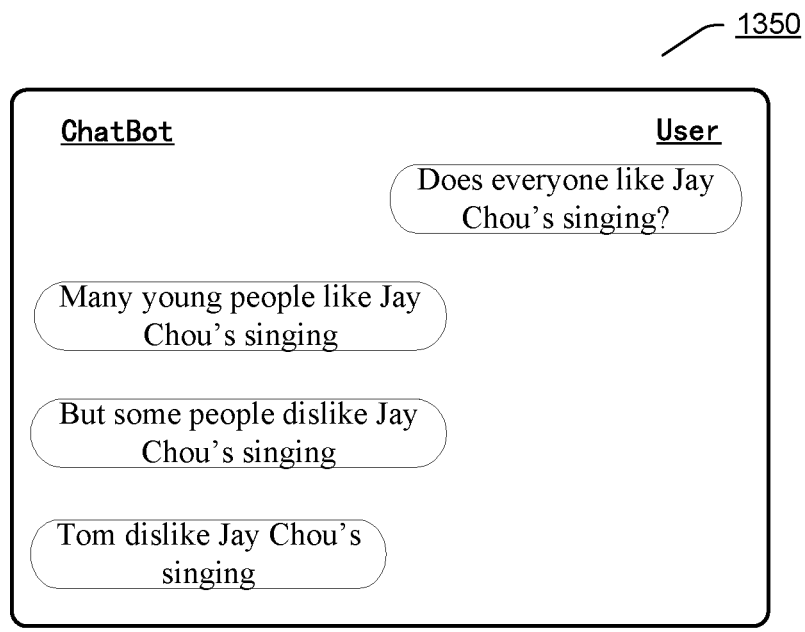
FIG. 13E illustrates a user interface for a response provided when the message processing parameter indicates acquisition of statement sentence nodes that have a neutral standpoint on the topic related to the statement sentence message according to an embodiment.

FIG. 13E illustrates a user interface for a response provided when the message processing parameter indicates acquisition of statement sentence nodes that have a neutral standpoint on the topic related to the statement sentence message according to an embodiment. As shown in FIG. 13E, the session message input by the user is "Does everyone like Jay Chou's singing?", by performing semantic analysis on the session message, the statement sentence message may be determined as "everyone likes Jay Chou's singing", and the message processing parameter indicates to obtain statement sentences that belong to the same topic category as the statement sentence message. In addition, the node standpoint parameter is determined as a neutral standpoint using the session message and/or the context information of the session message, etc. Based on the knowledge map, three responses are found: "Many young people like Jay Chou's singing", "But some people dislike Jay Chou's singing" and "Tom dislike Jay Chou's singing", and are displayed in the presentation area of the user interface in the terminal device.

Figure 14:
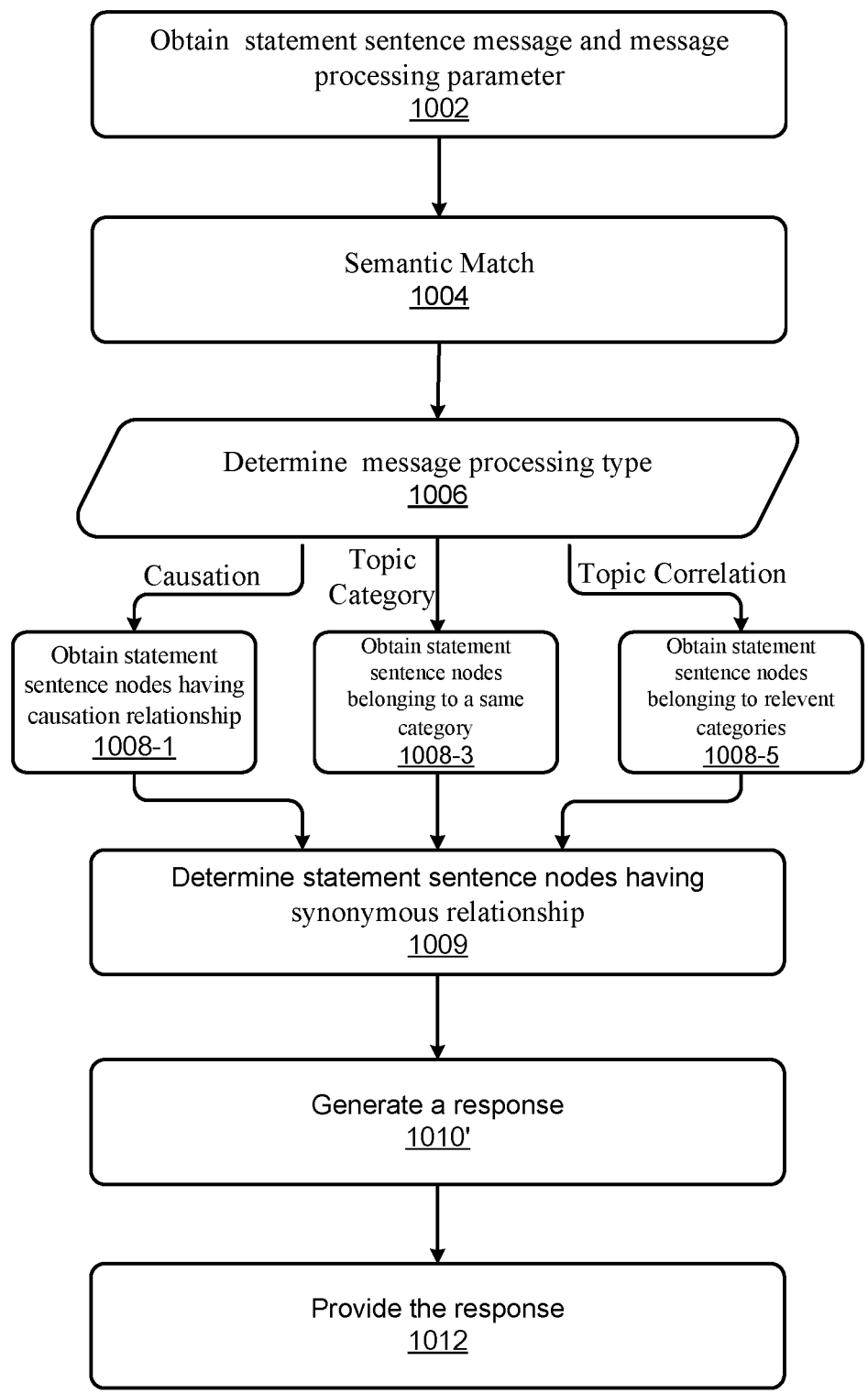
FIG. 14 illustrates a flow diagram of a method for processing a message according to another embodiment.

In addition, optionally, the statement sentence node in the knowledge map may also have an inter-node synonym relationship property. In this case, it is also necessary to refer to the inter-node synonym relationship property when determining the second statement sentence nodes. FIG. 14 shows a flow diagram of a method for message processing when a statement sentence node also has an inter-node synonym relationship property according to another embodiment.

The embodiment shown in FIG. 14 is a modification of the embodiment shown in FIG. 10. Specifically, after determining the one or more second statement sentence nodes at 1008, at 1009, one or more third statement sentence nodes having an inter-node synonymous relationship with the one or more second statement sentence nodes are obtained. Then, at 1010', a response is generated based on the statement sentences of the obtained second statement sentence node and third statement sentence nodes. The operations of other blocks in FIG. 14 are exactly the same as those of the corresponding blocks in FIG. 10, and details are not described herein again.

Figure 15A:
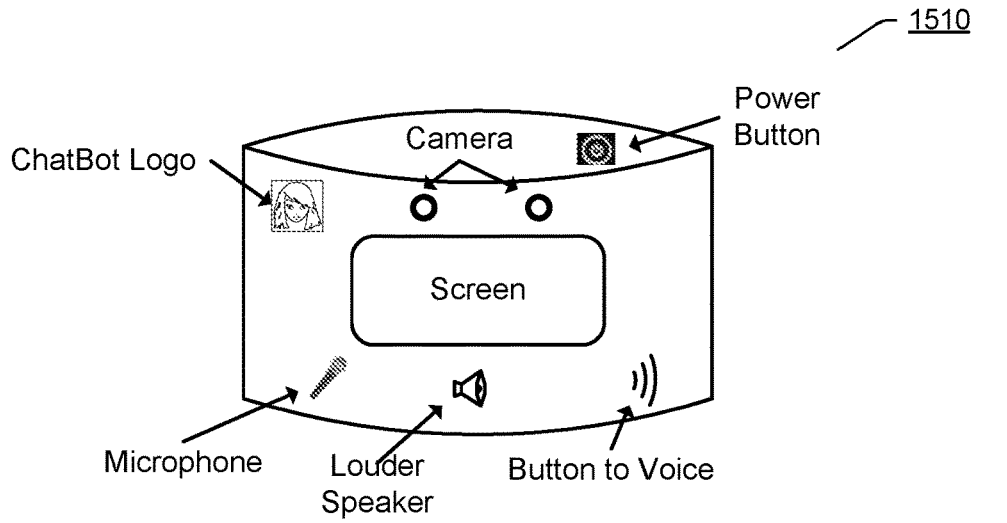
FIG. 15A-15C illustrate exemplary hardware devices for providing an automatic chatting service according to an embodiment.
Figure 15B:
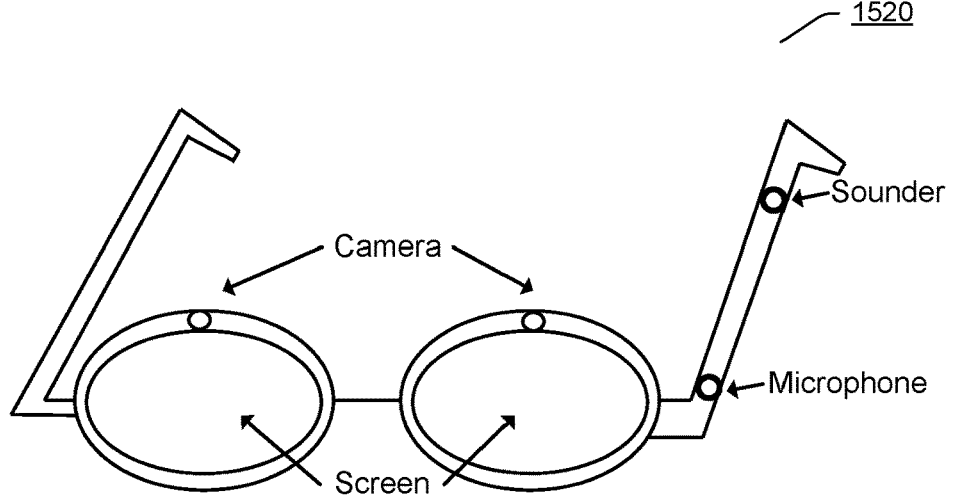
Figure 15C:
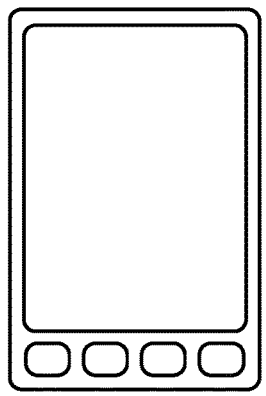

FIG. 15A-FIG. 15C illustrate exemplary hardware devices 1510, 1520 and 1530 for providing an automatic chatting service according to an embodiment. The chat bot according to the embodiments of the present disclosure may be implemented in the hardware devices 1510, 1520 and 1530.

The device 1510 is an intelligent terminal provided and used at a location of a partner. The device 1510 may comprise: at least one camera, for capturing a user's image or capturing images of articles in the user's view; a screen, which may present visual information to the user or may be touchable for interaction with the user; a microphone and a loudspeaker, for communicating with the user by voice; a button to voice, for switching to a voice-only mode; a power button; and a chat bot logo. According to actual requirements, the device 1510 may comprise more or less components. The device 1510 may be placed in a fixed location or may be carried by users. For example, the device 1510 may be placed at an entrance of art galleries, museums, etc., for guiding a user to visit, may be placed nearby a certain exhibited article so as to communicate with a user when the user is nearby the exhibited article, or may be carried by a user so as to provide an automated chatting service during the period the user carries it.

The device 1520 is a wearable device which comprises at least one screen, at least one camera, a sounder, a microphone, etc. Although the device 1520 is shown alike glasses, it can be any other types of wearable device, e.g., an intelligent watch.

The device 1530 is an intelligent terminal owned by a user. The device 1530 may be a smart phone, a tablet, a laptop, a desktop computer, etc. Through the device 1530, the user may communicate with the chat bot without restrictions of location.

It should be appreciated that the devices 1510, 1520 and 1530 are exemplary, and the chat bot according to the embodiments of the present disclosure may be implemented in any other types of hardware device.

Figure 16:
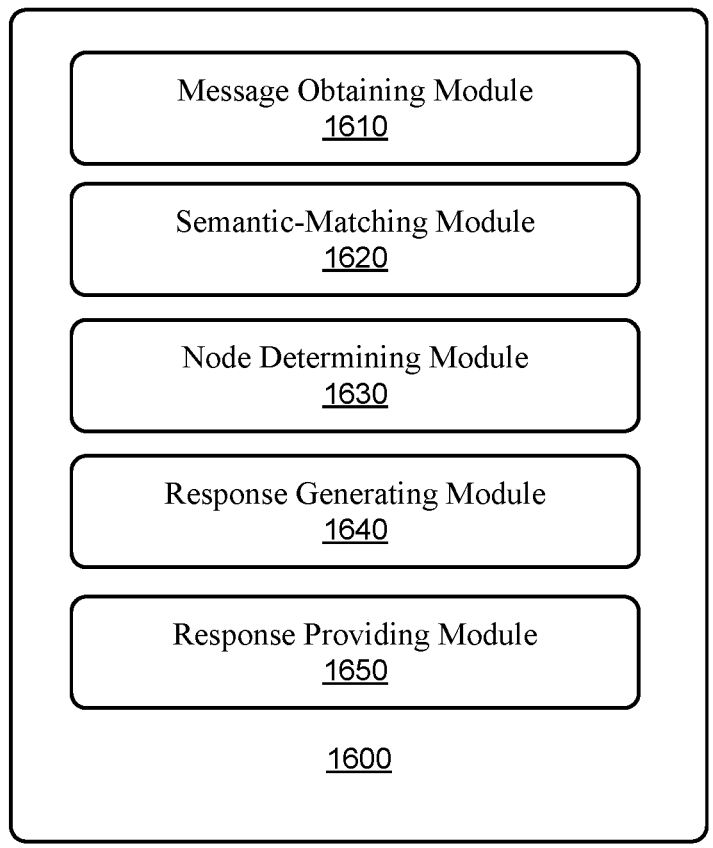
FIG. 16 illustrates an exemplary apparatus for processing a message according to an embodiment.

FIG. 16 illustrates an exemplary apparatus 1600 for processing a message according to an embodiment.

As shown in FIG. 16, the apparatus 1600 may comprise: a message obtaining module 1610, a semantic-matching module 1620, a node determining module 1630, a response generating module 1640 and a response providing module 1650.

The message obtaining module 1610 is configured to obtain a statement sentence message a message processing parameter that are associated with a user's session message. The semantic-matching module 1620 is configured to identify one or more first statement sentence nodes that are semantic-matched with the statement sentence message in a knowledge graph, wherein the knowledge graph includes a plurality of statement sentence nodes; each statement sentence node has a statement sentence and a node relationship property. The node determining module 1630 is configured to obtain, from the knowledge graph, one or more second statement sentence nodes that are indicated by the node relationship properties of the one or more first statement sentence nodes corresponding to the message processing parameter. The response generating module 1640 is configured to generate a response based at least in part on the statement sentences of the one or more second statement sentence nodes. The response providing module 1650 is configured to provide the generated response to the user.

According to an embodiment, the message obtaining module 1610 may extract the statement sentence message from the user's session message, and perform an intention analysis on the session message to determine the message processing parameter.

According to an embodiment, the node relationship property may include at least one of an inter-node causation relationship property, a node topic category property, and an inter-node topic correlation property. When the message processing parameter indicates that the query is made in the knowledge map based on the inter-node causation relationship property, the node determining module 1630 is configured to obtain, from the knowledge map, the one or more second statement sentence nodes as a premise or conclusion of the statement sentence message. When the message processing parameter indicates that the query is based on the node topic category property, the node determining module 1630 is configured to obtain, from the knowledge map, the one or more second statement sentence nodes that belong to the same topic as that of the statement sentence message. When the message processing parameter indicates that the query is based on the inter-node topic correlation property, the node determining module 1630 is configured to obtain, from the knowledge map, one or more second statement sentence nodes having a topic correlation with the topics involved in the statement sentence message.

According to an embodiment, the node relationship property may also comprise an inter-node synonym relationship property. The node determination module 1630 may also retrieve from the knowledge map one or more third statement sentence nodes having an inter-node synonymous relationship with the one or more second statement sentence nodes. Response generation module 1640 may generate a response based on the one or more second statement sentence nodes and the one or more third statement sentence nodes.

According to an embodiment, the node relationship property may also comprise a node standpoint property. The apparatus 1600 may comprise a node standpoint parameter determining module (not shown), for determining a node standpoint parameter associated with the user's session message when the message processing parameter indicates that the statement sentences are obtained based on the standpoint. The node determining module 1630 is further configured to obtain one or more fourth statement sentence nodes that are matched with the determined node standpoint parameter from the one or more second statement sentence nodes. The response generating module 1640 is configured to generate a response based at least in part on the statement sentences of the one or more fourth statement sentence nodes. According to an embodiment, the node standpoint parameter is determined based on at least one of the following messages: the session message; a context message of the session message; a user's standpoint preference information; and a set standpoint processing rule.

According to an embodiment, the statement sentence node may also have at least one of a source webpage address and a timestamp. The apparatus 1600 may also comprise a filter (not shown). The filter is configured to filter the statement sentences obtained based on the node relationship property, using the source webpage address and the timestamp of the statement sentence node. According to an embodiment, the filer may be configured to: obtain, from the knowledge graph, candidate statement sentence nodes that are indicated by the node relationship properties of the one or more first statement sentence nodes corresponding to the message processing parameter; sort candidate statement sentence nodes using the source webpage address and/or the timestamp of the obtained candidate statement sentence nodes; and determine the one or more second statement sentence nodes from the sorted candidate statement sentence nodes.

According to an embodiment, the knowledge map may also store a statement sentence node—complete sentence mapping. The node determination module 1630 may obtain complete sentences corresponding to the statement sentence nodes, which is obtained based on the node relationship property, based on the statement sentence node—complete sentence mapping. The response generation module 1640 is configured to generate a response based at least in part on the statement sentences of the one or more second statement sentence nodes and/or the obtained corresponding complete sentences.

According to an embodiment, the apparatus 1600 may comprise the knowledge map 254. According to another embodiment, the apparatus 1600 may not comprise the knowledge map 254, and the knowledge map 254 is in a device remote from the apparatus 1600 (e.g., a cloud server, network device, etc.), the device may be communicated with the apparatus 1600 in a wired or wireless manner.

Figure 17:
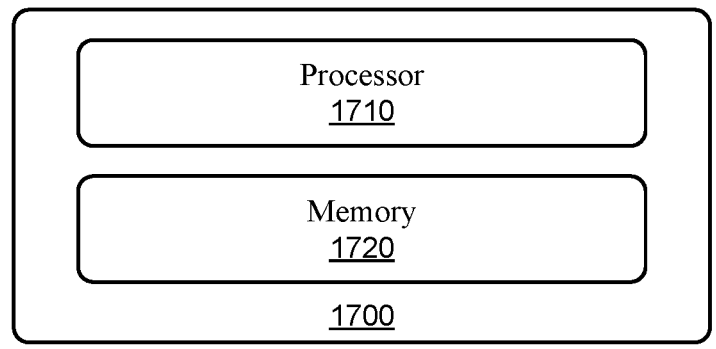
FIG. 17 illustrates a computing apparatus for processing a message according to an embodiment.

FIG. 17 illustrates an exemplary computing device 1700 for processing a message according to an embodiment.

The computing device 1700 may comprise at least one processor 1710. The computing device 1700 may also comprise a memory 1720 coupled to the at least one processor 1710. The memory 1720 may store computer-executable instructions. When executing the computer-executable instructions, the at least one processor 1710 may perform any of the operations of the method for processing a message according to the embodiments of the present disclosure described above. Alternatively, memory 1720 may also be omitted from the computing device 1700.

The embodiments of the present disclosure may be embodied in a non-transitory computer-readable medium. The non-transitory computer-readable medium may comprise instructions that, when executed, cause one or more processors to perform any operations of the methods for processing a message according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are intended to be encompassed by the claims.

The invention claimed is:

1. A method for processing a message, comprising:
obtaining a statement sentence message and a message processing parameter that are associated with a user's session message;
identifying one or more first statement sentence nodes that are semantic-matched with the statement sentence message in a knowledge graph and include at least one of a source webpage address and a timestamp, wherein the knowledge graph includes a plurality of statement sentence nodes, each first statement sentence node has a statement sentence and a node relationship property;
obtaining, from the knowledge graph, one or more second statement sentence nodes that are indicated by the node relationship property of the one or more first statement sentence nodes corresponding to the message processing parameter, wherein obtaining one or more second statement sentence nodes further comprises:
  obtaining, from the knowledge graph, candidate statement sentence nodes that are indicated by the node relationship properties of the one or more first statement sentence nodes corresponding to the message processing parameter;
  sorting candidate statement sentence nodes using the source webpage address and/or the timestamp of the obtained candidate statement sentence nodes; and
  determining the one or more second statement sentence nodes from the sorted candidate statement sentence nodes;

generating a response based at least in part on statement sentences of the one or more second statement sentence nodes; and providing the generated response to the user.

2. The method of claim 1, wherein the node relationship property comprises at least one of an inter-node causation relationship property, a node topic category property, and an inter-node topic correlation property.

3. The method of claim 2, wherein the node relationship property comprises an inter-node synonymous relationship property, and the method further comprises:
obtaining one or more third statement sentence nodes that have synonymous relationship with the one or more second statement sentence nodes,
wherein generating a response based at least in part on h statement sentences of the one or more second statement sentence nodes comprises:
generating a response based at least in part on the statement sentences of the one or more second statement sentence nodes and the statement sentences of the one or more third statement sentence nodes.

4. The method of claim 2, wherein the message processing parameter indicates obtaining a statement sentence as a premise or conclusion of the statement sentence message, and
obtaining, from the knowledge graph, one or more second statement sentence nodes that are indicated by the node relationship property of the one or more first statement sentence nodes corresponding to the message processing parameter comprises:
obtaining, from the knowledge graph, one or more second statement sentence nodes as the premise or conclusion of the one or more first statement sentence nodes, based on the node topic category properties of the one or more first statement sentence nodes.

5. The method of claim 4, wherein the node relationship property comprises a node standpoint property, the message processing parameter further indicates obtaining a statement sentence based on the standpoint, and the method further comprises:
determining a node standpoint parameter associated with the session message; and
obtaining one or more fourth statement sentence nodes that are matched with the determined node standpoint parameter from the one or more second statement sentence nodes,
wherein generating a response based at least in part on the statement sentences of the one or more second statement sentence nodes comprises:
generating a response based at least in part on the statement sentences of the one or more fourth statement sentence nodes.

6. The method of claim 5, wherein the node standpoint parameter is determined based on at least one of the following messages:
the session message;
a context message of the session message;
a user's standpoint preference information; and
a set standpoint processing rule.

7. The method of claim 2, wherein the message processing parameter indicates obtaining a statement sentence that belongs to a same topic category as that of the statement sentence message, and
obtaining, from the knowledge graph, one or more second statement sentence nodes that are indicated by the node relationship property of the one or more first statement sentence nodes corresponding to the message processing parameter comprises:
obtaining, from the knowledge graph, one or more statement sentence nodes that belong to a same topic category as that of the one or more first statement sentence nodes as the one or more second statement sentence nodes, based on the inter-node causation relationship properties of the one or more first statement sentence nodes.

8. The method of claim 2, wherein the message processing parameter indicates obtaining a statement sentence that has topic correlation with the topic category of die statement sentence message, and
obtaining, from the knowledge graph, one or more second statement sentence nodes that are indicated by the node relationship property of the one or more first statement sentence nodes corresponding to the message processing parameter comprises:
obtaining, from the knowledge graph, one or more statement sentence nodes that have topic correlation with the topic categories of the one or more first statement sentence nodes as the one or more second statement sentence nodes, based on the inter-node topic correlation properties of the one or more first statement sentence nodes.

9. The method of claim 1, wherein obtaining a statement sentence message and a message processing parameter that are associated with a user's session message comprises:
exacting the statement message from the session message; and
performing intention analysis on the session message to obtain the message processing parameter.

10. The method of claim 1, wherein a statement sentence node-complete sentence mapping is also stored in the knowledge map, and the method further comprises;
obtaining complete sentences corresponding to the one or more second statement sentence nodes, based on the statement sentence node-complete sentence mapping,
wherein generating a response based at least in part on the statement sentences of the one or more second statement sentence nodes comprises
generating a response based at least in part on the statement sentences of the one or more second statement sentence nodes and/or the obtained corresponding complete sentences.

11. An apparatus for processing a message, comprising:
a message obtaining module, for obtaining a statement sentence message and a message processing parameter that are associated with a user's session message;
a semantic-matching module, for identifying one or more first statement sentence nodes that are semantic-matched with the statement sentence message in a knowledge graph and include at least one of a source webpage address and a timestamp, wherein the knowledge graph includes a plurality of statement sentence nodes, each statement sentence node has a statement sentence and a node relationship property;
a node determining module, for obtaining, from the knowledge graph, one or more second statement sentence nodes that are indicated by the node relationship properties of the one or more first statement sentence nodes corresponding to the message processing parameter, wherein obtaining one or more second statement sentence nodes further comprises:
obtaining, from the knowledge graph, candidate statement sentence nodes that are indicated by the node relationship properties of the one or more first statement sentence nodes corresponding to the message processing parameter;
sorting candidate statement sentence nodes using the source webpage address and/or the timestamp of the obtained candidate statement sentence nodes; and
determining the one or more second statement sentence nodes from the sorted candidate statement sentence nodes;
a response generating module, for generating a response based at least in part on statement sentences of the one or more second statement sentence nodes; and
a response providing module, for providing the generated response to the user.

12. The apparatus of claim 11, wherein the node relationship property comprises at least one of an inter-node causation relationship property, a node topic category property, and an inter-node topic correlation property, and the node relationship property further comprises an inter-node synonymous relationship property, and
the node determining module is further configured to obtain one or more third statement sentence nodes that have synonymous relationship with the one or more second statement sentence nodes,
wherein the response generating module is configured to generate a response based at least in part on the statement sentences of the one or more second statement sentence nodes and the statement sentences of the one or more third statement sentence nodes.

13. The apparatus of claim 12, wherein the node relationship property comprises a node standpoint property, the message processing parameter further indicates obtaining a statement sentence based on the standpoint, and the apparatus further comprises:
a node standpoint parameter determining module for determining a node standpoint parameter associated with the session message,
wherein the node determining module is further configured to obtain one or more fourth statement sentence nodes that are matched with the determined node standpoint parameter from the one or more second statement sentence nodes,
wherein the response generating module is configured to generate a response based at least in part on the statement sentences of the one or more fourth statement sentence nodes.

14. A computing device, comprising:
a processor; and
a memory storing computer-executable instructions that, when executed, cause the processor to perform
obtaining a statement sentence message and a message processing parameter that are associated with a user's session message;
identifying one or more first statement sentence nodes that are semantic-matched with the statement sentence message in a knowledge graph and include at least one of a source webpage address and a timestamp, wherein the knowledge graph includes a plurality of statement sentence nodes, each first statement sentence node has a statement sentence and a node relationship property;
obtaining, from the knowledge graph, one or more second statement sentence nodes that are indicated by the node relationship property of the one or more first statement sentence nodes corresponding to the message processing parameter, wherein obtaining one or more second statement sentence nodes further comprises:
obtaining, from the knowledge graph, candidate statement sentence nodes that are indicated b the node relationship properties of the one or more first statement sentence nodes corresponding to the message processing parameter;
sorting candidate statement sentence nodes using the source webpage address and/or the timestamp of the obtained candidate statement sentence nodes; and
determining the one or more second statement sentence nodes from the sorted candidate statement sentence nodes;
generating a response based at least in part on statement sentences of the one or more second statement sentence nodes; and
providing the generated response to the user.

15. The computing device of claim 14, wherein the node relationship property comprises at least one of an inter-node causation relationship property, a node topic category property, and an inter-node topic correlation property.

16. The computing device of claim 15, wherein the node relationship property comprises an inter-node synonymous relationship property, and the method further comprises:
obtaining one or more third statement sentence nodes that have synonymous relationship with the one or more second statement sentence nodes,
wherein generating a response based at least in part on the statement sentences of the one or more second statement sentence nodes comprises:
generating a response based at least in part on the statement sentences of the one or more second statement sentence nodes and the statement sentences of the one or more third statement sentence nodes.

17. The computing device of claim 15, wherein the message processing parameter indicates obtaining a statement sentence as a premise or conclusion of the statement sentence message, and
obtaining, from the knowledge graph, one or more second statement sentence nodes that are indicated by the node relationship property of the one or more first statement sentence nodes corresponding to the message processing parameter comprises:
obtaining, from the knowledge graph, one or more second statement sentence nodes as the premise or conclusion of the one or more first statement sentence nodes, based on the node topic category properties of the one or more first statement sentence nodes.

18. The computing device of claim 15, wherein the message processing parameter indicates obtaining a statement sentence that belongs to a same topic category as that of the statement sentence message, and
obtaining, from the knowledge graph, one or more second statement sentence nodes that are indicated by the node relationship property of the one or more first statement sentence nodes corresponding to the message processing parameter comprises:
obtaining, from the knowledge graph, one or more statement sentence nodes that belong to a same topic category as that of the one or more first statement sentence nodes as the one or more second statement sentence nodes, based on the inter-node causation relationship properties of the one or more first statement sentence nodes.

19. The computing device of claim 15, wherein the message processing parameter indicates obtaining a statement sentence that has topic correlation with the topic category of the statement sentence message, and obtaining, from the knowledge graph, one or more second statement sentence nodes that are indicated by the node relationship property of the one or more first statement sentence nodes corresponding to the message processing parameter comprises:

obtaining, from the knowledge graph, one or more statement sentence nodes that have topic correlation with the topic categories of the one or more first statement sentence nodes as the one or more second statement sentence nodes, based on the inter-node topic correlation properties of the one or more first statement sentence nodes.

* * * * *